(12) United States Patent
Minamigata et al.

(10) Patent No.: US 8,585,089 B2
(45) Date of Patent: *Nov. 19, 2013

(54) STEERING COLUMN SUPPORT APPARATUS AND ASSEMBLY METHOD

(75) Inventors: Takahiro Minamigata, Gunma (JP); Minao Umeda, Gunma (JP); Takeshi Fujiwara, Gunma (JP); Osamu Tatewaki, Gunma (JP); Kiyoshi Sadakata, Gunma (JP)

(73) Assignee: NSK, Ltd. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/379,491

(22) PCT Filed: Sep. 26, 2011

(86) PCT No.: PCT/JP2011/071923
§ 371 (c)(1),
(2), (4) Date: Apr. 26, 2012

(87) PCT Pub. No.: WO2012/053319
PCT Pub. Date: Apr. 26, 2012

(65) Prior Publication Data
US 2012/0291585 A1 Nov. 22, 2012

(51) Int. Cl.
*B62D 1/19* (2006.01)

(52) U.S. Cl.
USPC ............................................. 280/777

(58) Field of Classification Search
USPC ............... 280/777, 779, 780; 74/492, 493
See application file for complete search history.

(56) References Cited

U.S. PATENT DOCUMENTS

| 2011/0036198 | A1 | 2/2011 | Minamigata | |
| 2012/0112443 | A1* | 5/2012 | Arakawa et al. | 280/777 |
| 2012/0169035 | A1* | 7/2012 | Minamigata et al. | 280/777 |
| 2012/0187669 | A1* | 7/2012 | Minamigata et al. | 280/777 |
| 2012/0267884 | A1* | 10/2012 | Fujiwara et al. | 280/777 |
| 2012/0299281 | A1* | 11/2012 | Fujiwara et al. | 280/777 |

FOREIGN PATENT DOCUMENTS

| JP | 1976038841 | 3/1976 |
| JP | 1976119231 | 9/1976 |
| JP | 51121929 | 10/1976 |
| JP | 1976121929 | 10/1976 |
| JP | 1086792 | 3/1989 |

(Continued)

*Primary Examiner* — Faye M. Fleming
(74) *Attorney, Agent, or Firm* — Hartman Global IP Law; Gary M. Hartman; Domenica N.S. Hartman

(57) ABSTRACT

An assembly method for a steering column support apparatus is achieved that simplifies tuning for stabilizing forward displacement of a steering wheel during a secondary collision, eliminates space in the engagement section between a bracket 11 on the vehicle side and a locking capsule 47a, and suppresses rocking displacement of the steering column due to that space. Of a plurality of small through holes 49a, 49b on the capsule side and a plurality of small notch sections 55a, 55b, part of the small through holes 49a and the small notch sections 55a are aligned, and pin shaped members 58 are formed so as to span these small through holes and small notch sections. After that, the locking capsule 47a and bracket 11 on the vehicle side are put into the final assembled position, shearing the pin shaped members 58 in the process. The remaining small though holes 49b, the remaining small notch sections 55b and small through holes 54 are aligned, and locking pins 50, 50a that shear during a secondary collision are formed so as to span these holes.

6 Claims, 21 Drawing Sheets

(56) References Cited

FOREIGN PATENT DOCUMENTS

| | | |
|---|---|---|
| JP | 1977041820 | 3/1997 |
| JP | 2000006821 | 1/2000 |
| JP | 2005219641 | 8/2005 |
| JP | 2007069821 | 3/2007 |
| JP | 2009196562 | 9/2009 |

* cited by examiner (a)

(b)

(a)

(b)

(A)

(B)

(A)

(B)

(A)

(B)

STEERING COLUMN SUPPORT APPARATUS AND ASSEMBLY METHOD

TECHNICAL FIELD

The present invention relates to the construction and assembly method of a steering column support apparatus for absorbing impact energy that is applied to a steering wheel from the body of a driver during a collision accident, and for supporting the steering column by the vehicle body so that the steering column can displace in the forward direction together with the steering wheel.

BACKGROUND ART

A steering apparatus for an automobile, as illustrated in FIG. 17, is constructed so that rotation of the steering wheel 1 is transmitted to an input shaft 3 of a steering gear unit 2, and as this input shaft 3 turns, the input shaft 3 pushes or pulls a pair of left and right tie rods 4, which apply a steering angle to the front wheels of the automobile. In order to accomplish this, the steering wheel 1 is fastened to and supported by the rear end section of a steering shaft 5, and this steering shaft 5 is inserted in the axial direction through a cylindrical shaped steering column 6, and is supported by this steering column 6 such that it can rotate freely. The front end section of the steering shaft 5 is connected to the rear end section of an intermediate shaft 8 via a universal joint 7, and the front end section of this intermediate shaft 8 is connected to the input shaft 3 via a different universal joint 9. The intermediate shaft 8 is constructed so that the shaft can transmit torque, and can contract along its entire length due to an impact load, so that when the steering gear unit 2 is displaced in the backward direction due to a primary collision between an automobile and another automobile, that displacement is absorbed, which prevents the steering wheel 1 from displacing in the backward direction via the steering shaft 5 and hitting the body of the driver.

In order to protect the body of the driver, this kind of steering apparatus for an automobile requires construction that allows the steering wheel to displace in the forward direction while absorbing impact energy during a collision accident. In other words, after the primary collision in a collision accident, a secondary collision occurs when the body of the driver collides with the steering wheel 1. In order to protect the driver by lessening the impact applied to the body of the driver during this secondary collision, construction is known (refer to JP51-121929(U) and JP2005-219641(A)) and widely used in which an energy absorbing member, which absorbs an impact load by plastically deforming, is provided between the vehicle body and a member that supports the steering column 6 that supports the steering wheel 1 with respect to the vehicle body so that it can break away in the forward direction due to an impact load in the forward direction during a secondary collision, and displaces in the forward direction together with the steering column 6

FIG. 18 to FIG. 20 illustrate an example of this kind of steering apparatus. A housing 10, which houses the reduction gear and the like of an electric power steering apparatus, is fastened to the front end section of a steering column 6a. A steering shaft 5a is supported on the inside of the steering column 6a such that it can only rotate freely, and a steering wheel 1 (see FIG. 17) can be fastened to the portion on the rear end section of this steering shaft 5a that protrudes from the opening on the rear end of the steering column 6a. The steering column 6a and the housing 10 are supported by a bracket 11 on the vehicle side (not shown in FIG. 18 to FIG. 20, but refer to FIG. 4, for example) that is fastened to the vehicle body so that they can break away in the forward direction due to an impact load in the forward direction.

To accomplish this, a bracket 12 on the column side that is supported in the middle section of the steering column 6a and a bracket 13 on the housing side that is supported by the housing 10 are supported with respect to the vehicle body so that they both can break away in the forward direction due to an impact load in the forward direction. These brackets 12, 13 both comprise installation plate sections 14a, 14b at one to two locations, and cutout sections 15a, 15b are formed in these installation plate sections 14a, 14b so that they are open on the rear end edges. With these cutout sections 15a, 15b covered, sliding plates 16a, 16b are assembled in the portions of the brackets 12, 13 near both the left and right ends.

These sliding plates 16a, 16b are formed by bending thin metal plate such as carbon steel plate or stainless steel plate having a layer of a synthetic resin that slides easily, such as polyamide resin (nylon), polytetrafluoroethylene resin (PTFE) or the like on the surface into a U shape, having a top and bottom plate section that are connected by connecting plate section. Through holes for inserting bolts or studs are formed in portions of the top and bottom plates that are aligned with each other. With these sliding plates 16a, 16b mounted on the installation plate sections 14a, 14b, the through holes are aligned with the cutout sections 15a, 15b that are formed in these installation plate sections 14a, 14b.

The bracket 12 on the column side and the bracket 13 on the housing side are supported by the bracket 11 on the vehicle side by screwing nuts onto bolts or studs that are inserted through the cutout sections 15a, 15b in the installation plate sections 14a, 14b and the through holes in the sliding plates 16a, 16b, and tightening the nuts. During a secondary collision, the bolts or studs come out from the cutout sections 15a, 15b together with the sliding plates 16a, 16b, which allows the steering column 6a and the housing 10 to displace in the forward direction together with the brackets 12 on the column side, the bracket 13 on the housing side and the steering wheel 1.

In the example in the figures, energy absorbing members 17 are provided between these bolts or studs and the bracket 12 on the column side. As this bracket 12 on the column side displaces in the forward direction, the energy absorbing members 17 plastically deform so as to absorb the impact energy that is transmitted to the bracket 12 on the column side by way of the steering shaft 5a and steering column 6a.

As illustrated in FIG. 20, during a secondary collision, the bolts or studs come out from the notch sections 15a, 15a which allows the bracket 12 on the column side to displace in the forward direction from the normal state illustrated in FIG. 19, and the steering column 6a displaces in the forward direction together with this bracket 12 on the column side. When this happens, the bracket 13 on the housing side also breaks away from the vehicle body, and is allowed to displace in the forward direction. As the bracket 12 on the column side displaces in the forward direction, the energy absorbing members 17 plastically deform and absorb the impact energy that is transmitted from the driver's body to the bracket 12 on the column side by way of the steering shaft 5a and the steering column 6a, which lessens the impact applied to the body of the driver.

In the case of the construction illustrated in FIG. 18 to FIG. 20, the bracket 12 on the column side is supported by the bracket 11 on the vehicle side at two locations, on both the right and left side, so that it can break away in the forward direction during a secondary collision. From the aspect of stable displacement in the forward direction without causing the steering wheel 1 to tilt, it is important during a secondary collision, that the pair of left and right support sections be disengaged at the same time. However, tuning in order that these support sections disengage at the same time is affected not only by resistance such as the friction resistance and the shear resistance to the disengagement of these support sections, but unbalance on the left and right of the inertial mass of the portion that displaces in the forward direction together with the steering column 6a, so takes time and trouble.

In order to stabilize the breaking away of the steering column in the forward direction during a secondary collision, applying the construction disclosed in JP51-121929(U) can be somewhat effective. FIG. 21 to FIG. 23 illustrate the construction disclosed in this document. In the case of this construction, a locking hole (locking notch) 18 is formed in the center section in the width direction of a bracket 11a on the vehicle side that is fastened to and supported by the vehicle body and that does not displace in the forward direction even during a secondary collision, and this locking hole 18 is open on the edge of the front end of the bracket 11a on the vehicle side. Moreover, a bracket 12a on the column side is such that it is able to displace in the forward direction together with a steering column 6b during a secondary collision.

Furthermore, both the left and right end sections of a locking capsule 19 that is fastened to this bracket 12a on the column side are locked in the locking hole 18. In other words, locking grooves 20 that are formed on both the left and right side surfaces of the locking capsule 19 engage with the edges on the both the left and right sides of the locking notch 18. Therefore, the portions on both the left and right end sections of the locking capsule 19 that exist on the top side of the locking grooves 20 are positioned on the top side of bracket 11a on the vehicle side on both side sections of the locking hole 18. When the bracket 11a on the vehicle side and the locking capsule 19 are engaged by way of the locking grooves 20 and the edges on both sides of the locking hole 18, locking pins 22 are pressure fitted into small locking holes 21a, 21b that are formed in positions in these members 11a, 19 that are aligned with each other, joining the members 11a, 19 together. These locking pins 22 are made using a relatively soft material such as an aluminum alloy, synthetic resin or the like that will shear under an impact load that is applied during a secondary collision.

When an impact load is applied during a secondary collision from the steering column 6b to the locking capsule 19 by way of the bracket 12a on the column side, these locking pins 22 shear. The locking capsule 19 then comes out in the forward direction from the locking hole 18, which allows the steering column 6b to displace in the forward direction of the steering wheel 1 that is supported by this steering column 6b via the steering shaft.

In the case of the construction illustrated in FIG. 21 to FIG. 23, the engagement section between the locking capsule 19 that is fastened to the bracket 12a on the column side and the bracket 11a on the vehicle side is located at only one location in the center section in the width direction. Therefore, tuning for disengaging this engagement section and causing the steering wheel 1 to displace stably in the forward direction during a secondary collision becomes simple.

However, in the conventional construction, the shape of the bracket 11a on the vehicle side is special, so the construction of connecting and fastening this bracket 11a on the vehicle side to the vehicle body becomes complex, and the assembly height becomes high, therefore there is a problem in that design freedom of the steering apparatus is lost. Moreover, the number of parts increases, the work for processing parts, managing parts and assembling parts becomes troublesome, and the costs increase. Furthermore, the assembly height, for example, the distance from the center of the steering column 6b to the installation surface on the vehicle side becomes large, and there is a disadvantage in that performing design in order that the steering column 6b does not interfere with the knees of the driver becomes difficult.

In addition, in the case of the conventional construction, in order to more completely protect the driver during a secondary collision, the following improvements are desired. In other words, in the case of construction in which the bracket 12a on the column side is supported with respect to the bracket on the vehicle side in only the center section in the width direction, even a small space existing in the support section causes rocking displacement that cannot be ignored. For example, when a space exists between the top and bottom surfaces of the of the bracket 11a on the vehicle side in the portion around the locking notch 18 and the inner surfaces of the locking grooves 20 that are formed in the locking capsule 19, this space becomes the cause of rocking displacement of the bracket 12a on the column side.

Furthermore, the inner edges of the locking notch 18 that are formed on the bracket 11a on the vehicle side directly face the edges on both the left and right sides of the locking capsule 19, however, during a secondary collision, the inner edges of the locking notch 18 rub against the edges on both the left and right sides of the locking capsule causing friction, and this locking capsule 19 comes out in the forward direction from the locking notch 18. Therefore, in order to lessen the impact that is applied to the body of the driver during a secondary collision, it is necessary for the locking capsule 19 to come out smoothly in the forward direction from the locking notch 18, and so it is necessary to keep the friction acting between the inner edges of the locking notch 18 and the edges on both the left and right sides of the locking capsule 19 low.

However, in order to maintain the necessary strength and rigidity of the bracket 11a on the vehicle side, it is often formed using a ferrous metal plate such as carbon steel. Moreover, in order to sufficiently maintain the reliability and durability of the connecting section between the bracket 11a on the vehicle side and the bracket 12a on the column side, the locking capsule is also often made using a metal material such as ferrous metal like mild steel or an aluminum alloy. When these materials are both metallic materials, there is contact between metallic materials in the section where the inner edges of the locking notch 18 and the edges on both the left and right sides of the locking capsule 19 rub and friction occurs.

The friction coefficient of the section where metallic materials come in contact is relatively large, so when large contact pressure is applied to the area where there is rubbing between the inner edges of the locking notch 18 and the edges on both the left and right sides of the locking capsule 19, there is a possibility that the locking capsule 19 will not come out smoothly in the forward direction from the locking notch 18. For example, when a diagonal force is applied in the forward direction to the locking capsule during a collision accident, large contact pressure is applied at the area where there is rubbing between these surfaces. As a result, the load required for the locking capsule to come out in the forward direction from the locking notch 18 becomes large.

JP2000-6821(A) of the related literatures discloses an energy absorbing member that plastically deforms as the steering column displaces in the forward direction together with the steering wheel in order to lessen the impact applied to the body of the driver that collides with the steering wheel during a secondary collision. Moreover, JP2007-69821(A) and JP 2008-100597(A) disclose construction in which adjustment of the steering wheel position is possible, and in which in order to increase the holding force for keeping the steering wheel in the adjusted position the friction surface is increased by overlapping a plurality of friction plates. However, in construction for supporting the bracket on the column side by the bracket on the vehicle side at only one location in the center section in the width direction, technology for keeping the load required for the locking capsule that is supported by the steering column to come out in the forward direction from the locking notch that is formed in the bracket on the vehicle side low, technology that makes it possible for forward displacement of the steering wheel during a secondary collision to be performed smoothly while keeping the construction compact and low cost, and technology for reducing the number of parts and maintaining design freedom of the steering apparatus is not disclosed in these documents.

[Related Literature]
[Patent Literature]
[Patent Literature 1] JP51-121929(U)
[Patent Literature 2] JP2005-219641(A)
[Patent Literature 3] JP10-86792(A)
[Patent Literature 4] JP2009-196562(A)
[Patent Literature 5] JP2000-6821(A)
[Patent Literature 6] JP2007-69821(A)
[Patent Literature 7] JP2008-100597(A)

SUMMARY OF THE INVENTION

Problem to be Solved by the Invention

In consideration of the situation above, the object of the present invention is to provide construction of a steering column support apparatus and assembly method thereof that simplifies tuning for stabilizing forward displacement of the steering wheel during a secondary collision, is compact and low cost and is capable of maintaining design freedom.

Particularly, the object of the present invention is to provide construction of a steering column support apparatus and assembly method thereof that eliminates space in the engagement section between the bracket on the vehicle side and the locking capsule, and suppresses rocking displacement of the steering column due to that space, and furthermore, as necessary, keeps the load required for the locking capsule that is supported by the steering column to come out in the forward direction from the locking hole that is formed in the bracket on the vehicle side low. Moreover, the present invention provides construction that suppresses an increase in assembly dimensions, making it possible to make the apparatus more compact.

Means for Solving the Problems

The steering column support apparatus that is the target of the assembly method of the present invention comprises a bracket on the vehicle side, a bracket on the column side and a locking capsule. Of these, the bracket on the vehicle side is supported by and fastened to the vehicle body side, and does not displace in the forward direction during a secondary collision. A locking hole that extends in the axial direction of the steering column is formed in the center section in the width direction of the bracket on the vehicle side. The bracket on the column side is supported by the steering column side and displaces in the forward direction together with the steering column during a secondary collision. The locking capsule is such that, with fastened to the bracket on the column side, both end sections of the locking capsule are locked in the locking hole, and both sides on the top end of the locking capsule are located on the top side of the bracket on the vehicle side in the portions on both sides of the locking hole.

With part of the locking capsule positioned inside the locking hole, by connecting this locking capsule and bracket on the vehicle side by connecting members made of synthetic resin that shear due to an impact load that is applied during a secondary collision, the bracket on the column side is supported by the bracket on the vehicle side such that the bracket on the column side can break away in the forward direction due to an impact load that is applied during a secondary collision.

In the present invention, when assembling the steering column support apparatus having this kind of construction, first, the locking capsule is fitted inside the locking hole, and the positional relationship between the locking capsule and the bracket on the vehicle side is in a state shifted from final assembled state. In this state, part of a plurality of through holes on the capsule side that are formed in the locking capsule, and part of a plurality of receiving sections on the bracket side that are formed in the bracket on the vehicle side are aligned.

The through holes on the capsule side are formed in part of the locking capsule such that they pass in the vertical direction through the portions that overlap in the vertical direction the portion of the bracket on the vehicle side that surrounds the locking hole. The receiving sections on the bracket side are formed in the portion of the bracket on the vehicle side that surrounds the locking hole, and, for example, pass through that portion in the vertical direction. However, the receiving sections on the bracket side can be concave sections that are constructed such that the top is open and the bottom section is closed.

With part of the through holes on the capsule side aligned with part of the receiving sections on the bracket side, pin shaped members are formed to span between this part of through holes on the capsule side and part of receiving sections on the bracket side.

After that, the locking capsule and the bracket on the vehicle side are placed in the final assembled state, shearing the pin shaped members in the process, and aligning the remaining through holes on the capsule side and the remaining receiving sections on the bracket side. The connecting members are then formed to span between these remaining through holes on the capsule side and the remaining receiving sections on the bracket side.

By performing assembly in this way, the steering column support apparatus of the present invention is such that in the assembled state, and in the normal state during operation, part of the through holes on the capsule side and part of the receiving sections on the bracket side are not aligned, and the sheared surfaces of the sheared pins that exist in at least one of these elastically come in contact with the top surface of the bracket on the vehicle side or an inner surface of the top end of the locking capsule.

The pin shaped members and the connecting members can be formed by injection molding of synthetic resin, or by pressure fitting pins made of synthetic resin or a light metal, however, in order that these members span between part of the through holes on the capsule side and part of the receiving sections on the bracket side, and/or span between the remaining through holes on the capsule side and the remaining receiving sections on the bracket side, preferably these members are formed by injection molding of synthetic resin.

When forming the pin member and the connecting member by injection molding of synthetic resin, preferably at least part of the receiving sections on the bracket side are small notched sections that are formed such that they open toward the inside of the locking hole. Part of the synthetic resin that is fed inside each of the small notch sections, when the locking capsule and bracket on the vehicle side are positioned in the final assembled state, penetrates between the inside surfaces of the locking hole and the inner surfaces of the locking capsule that face these inside surfaces and covers at least part of the space that exists between these surfaces. It is not necessary for all of the receiving sections on the bracket side to be small notch sections, and part of the receiving sections on the bracket side can be formed as through holes or concave sections that are formed in the portion surrounding the locking hole.

More preferably, the length in the forward/backward direction of the locking hole is greater than the length in the same direction of the locking capsule. More specifically, the length of the locking capsule is just long enough that even when the locking capsule has displaced in the forward direction together with the steering column due to a secondary collision, at least part of the locking capsule is positioned on the top side of the front end section of the bracket on the vehicle side, preventing the locking capsule from dropping down.

The final assembled state is a state wherein the locking capsule is pushed completely to the back end section of the locking hole. Moreover, the state shifted from the final assembled state is a state wherein the locking capsule is shifted further toward the opening side or front end side of the locking hole than the back end section of the locking hole.

Furthermore, in the steering column support apparatus of the present invention, at least part of the receiving sections on the bracket side are small notch sections that are formed to open toward the inside of the locking hole. Part of the synthetic resin that is fed inside the small notch sections penetrates in between the inside surfaces of the locking hole and the surfaces of the locking capsule that face these inside surfaces and covers at least part of the space that exists between these surfaces.

In the steering column support apparatus of the present invention, preferably through holes are formed in a plurality of locations that are separated at least in the width direction in the portions of the bracket on the column side that overlaps the locking capsule, and screw holes are formed in portions of the locking capsule that are aligned with the through holes. Bolts that are inserted from the bottom into the through holes are screwed into the screw holes, and tightened to connect and fasten the locking capsule and the bracket on the column side together.

In this case, more preferably, spacers having an outer diameter that is larger than the diameter of the circumscribed circle of the head section of the bolts and inner diameter of the through holes are held between the top surfaces of the head sections of the bolt and the bottom surface of the bracket on the column side.

Alternatively, in the steering column support apparatus of the present invention, preferably through holes are formed in a plurality of locations that are separated at least in the width direction in the portions of the bracket on the column side and locking capsule that overlap, and by holding the bracket on the column side and the locking capsule between head sections that are formed on the base end sections of rivets that are inserted through these through holes and swaged sections that are formed on the tip end sections of the rivets, the locking capsule and the bracket on the column side are connected and fastened together. Furthermore, due to the elasticity of one of the members that exist between the head sections and swaged sections of the rivets, the locking capsule and the bracket on the column side are elastically held between these head sections and swaged sections.

In this case, more preferably, the aforementioned member is the bracket on the column side. Therefore, before being connected and fastened to the locking capsule, the center section in the width direction of the bracket on the column side is depressed downward compared with both end sections. The rivets elastically deform this bracket on the column side, and with the top surface of the center section in the width direction in contact with the bottom surface of the locking capsule, or closer than in the state before elastically deformation, the locking capsule and the bracket on the column side are connected and fastened together.

When assembling the steering column support apparatus with this construction, the head sections of the rivets are pushed toward the bracket on the column side, causing the center section in the width direction of the bracket on the column side to elastically deform, and with the top surface of the center section in the width direction in contact with or close to the bottom surface of the locking capsule, swaged sections are formed on the tip end sections of the rivets, connecting and fastening the locking capsule and bracket on the column side together.

Alternatively, the aforementioned member is taken to be spring washers that are provided between the head sections or swaged sections that are formed on both end sections of the rivets and the opposing surface. With the rivets elastically deforming the spring washers in a direction shortening the thickness dimension in the axial direction of the rivets, the locking capsule and bracket on the column side are connected and fastened together.

When assembling the steering column support apparatus with this construction, the head sections of the rivets are pushed toward the bracket on the column side, and after the spring washers are fitted around these rivets, these spring washers are elastically deformed and swaged sections are formed on the tip end sections of the rivets, connecting and fastening the locking capsule and the bracket on the column side together.

In the case of either construction, the length in the forward/backward direction of the locking hole is greater than the length in the same direction of the locking capsule, with the length of the locking capsule being just long enough that even when the locking capsule has displaced in the forward direction together with the steering column due to a secondary collision, at least part of the locking capsule is positioned on the top side of the front end section of the bracket on the vehicle side, preventing the locking capsule from dropping down.

Advantage of the Invention

With the present invention, a steering column support apparatus is provided having construction that simplifies tuning for stabilizing forward displacement of the steering wheel during a secondary collision, eliminates space in the engagement section between the bracket on the vehicle side and the locking capsule and suppresses rocking displacement of the steering column due to that space. With this invention it is possible to improve the operational feeling when operating the steering wheel that is supported by and fastened to the steering shaft that is supported in this steering column such that it can rotate freely.

Moreover, with the present invention it is possible to keep the load required for the locking capsule that is supported by the steering column to come out when necessary in the forward direction from the locking hole low.

Furthermore, with the present invention it is possible to achieve construction that is more compact and low cost,

BEST MODES FOR CARRYING OUT THE INVENTION

[First Embodiment]

Figure 17:
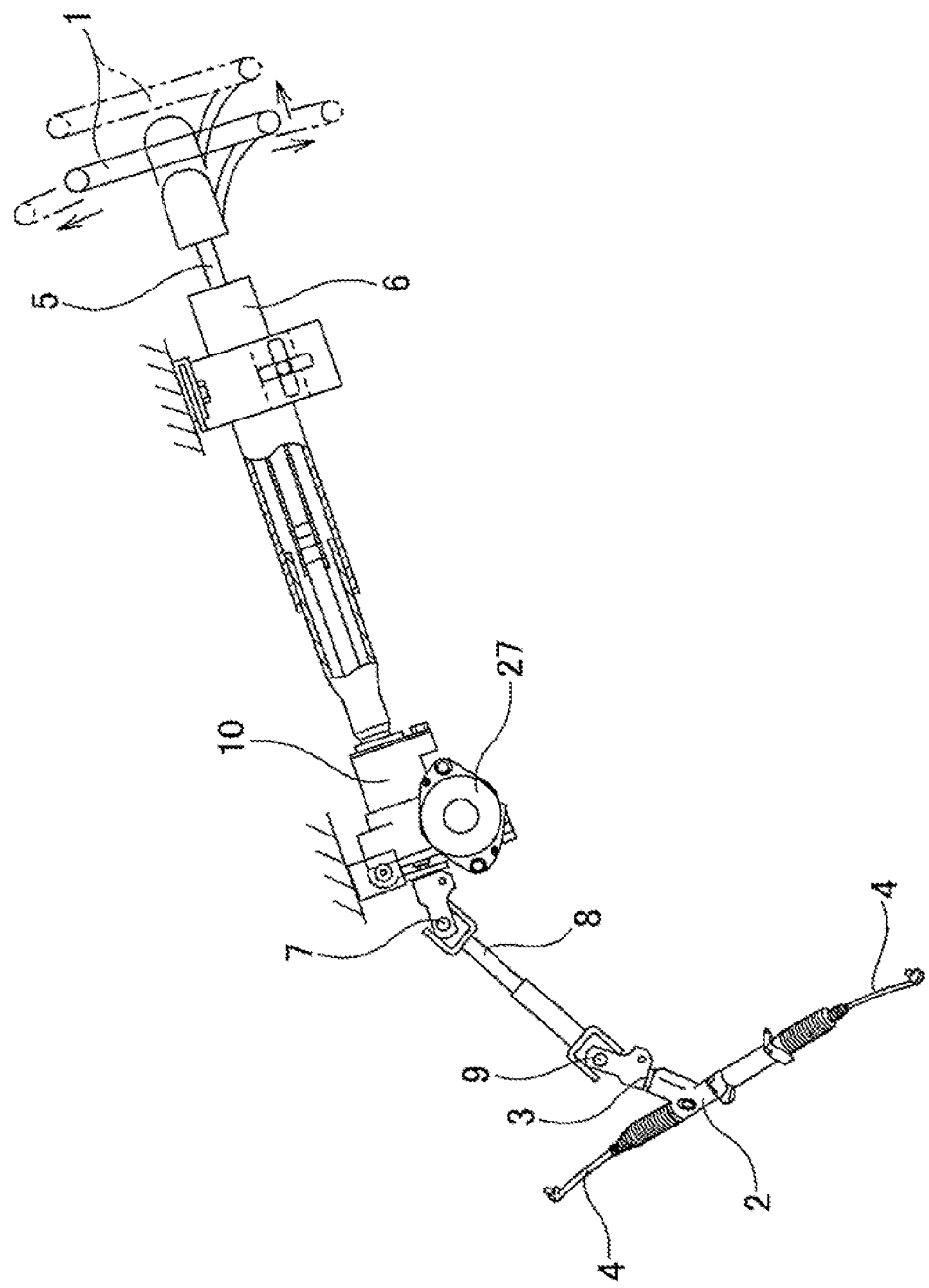
FIG. 17 is a partial cross-sectional view illustrating an example of a conventionally known steering apparatus.
Figure 18:
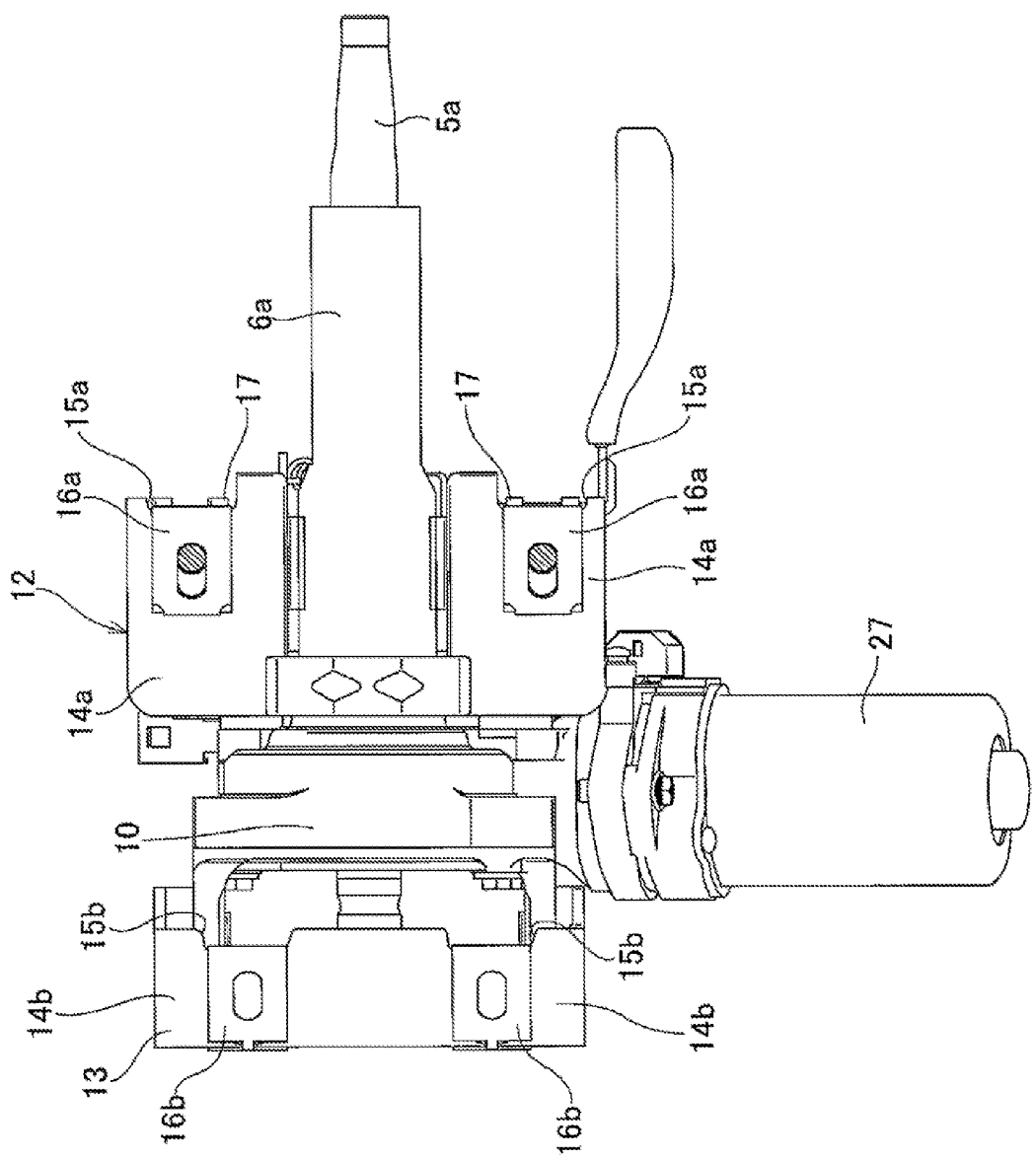
FIG. 18 is a top view illustrating an example of a conventional steering column support apparatus, and illustrates the normal state.
Figure 19:
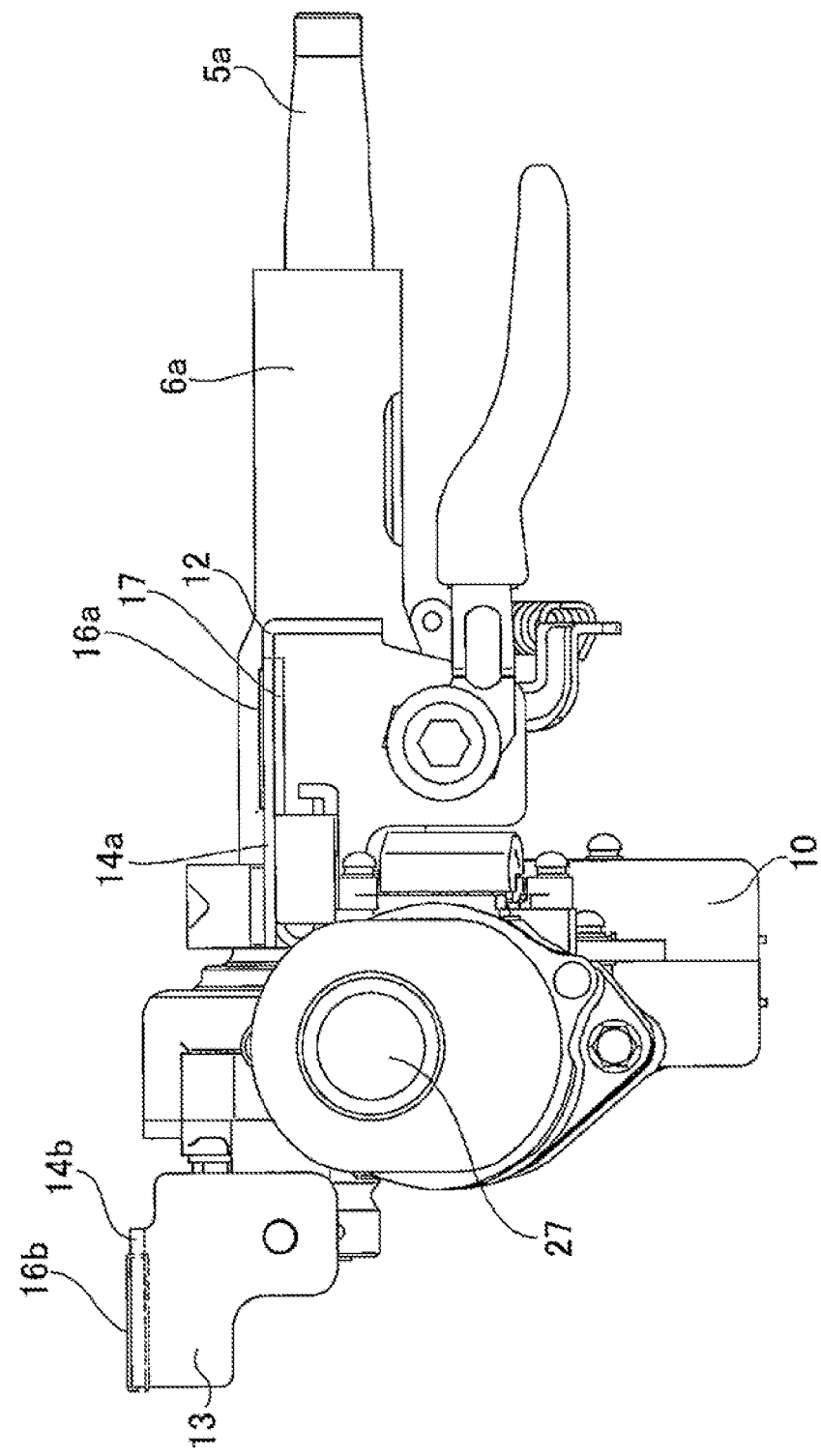
FIG. 19 is a side view of the apparatus in FIG. 18, and illustrates the normal state.
Figure 20:
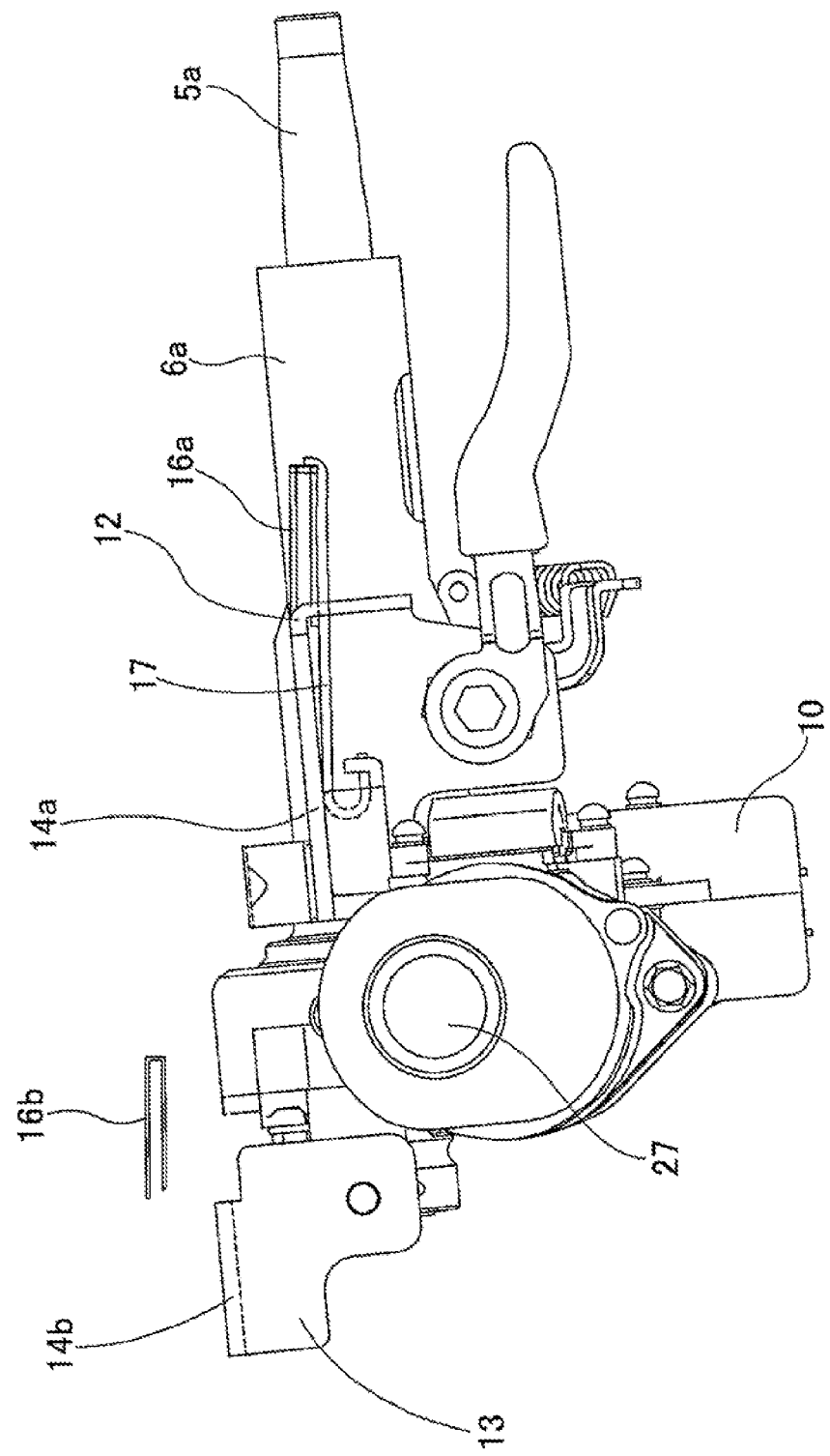
FIG. 20 is a side view of the apparatus in FIG. 18, and illustrates the state after the steering column has displaced due to a secondary collision.
Figure 21:
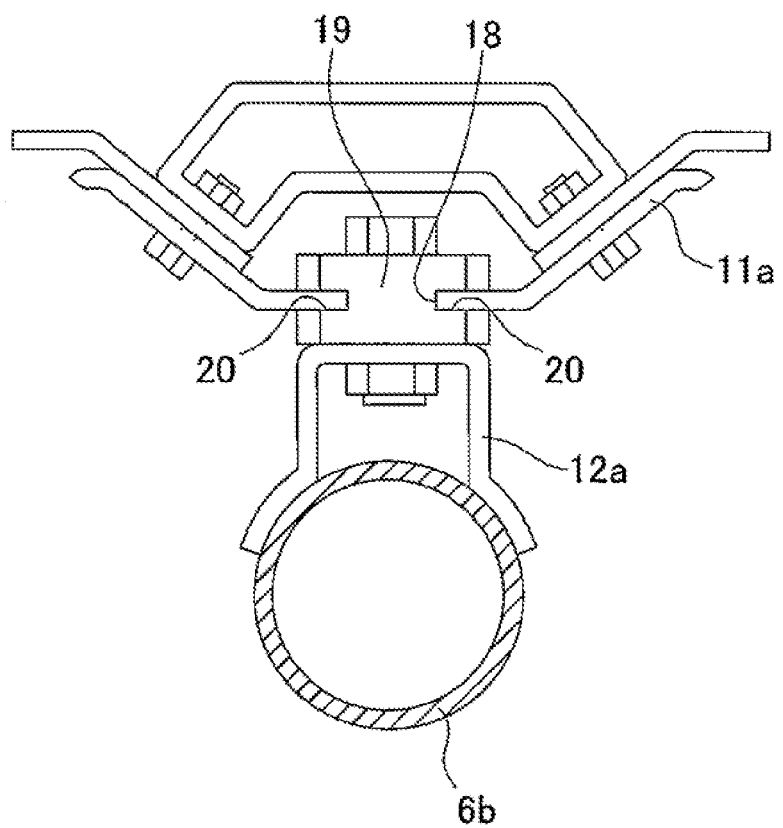
FIG. 21 illustrates an example of conventional construction, and is a cross-section view of a virtual plane that exists in a direction that is orthogonal to the center axis of the steering column.
Figure 22:
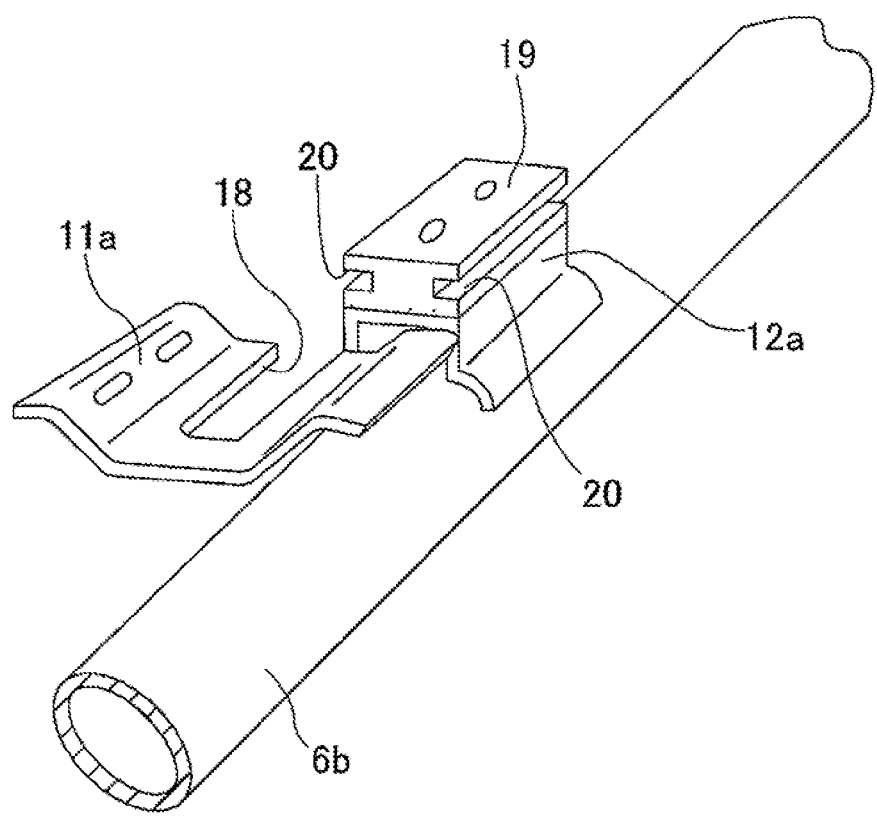
FIG. 22 is a perspective view of the construction in FIG. 21, and illustrates the state before the bracket on the vehicle side and the bracket on the column side are connected.
Figure 23:
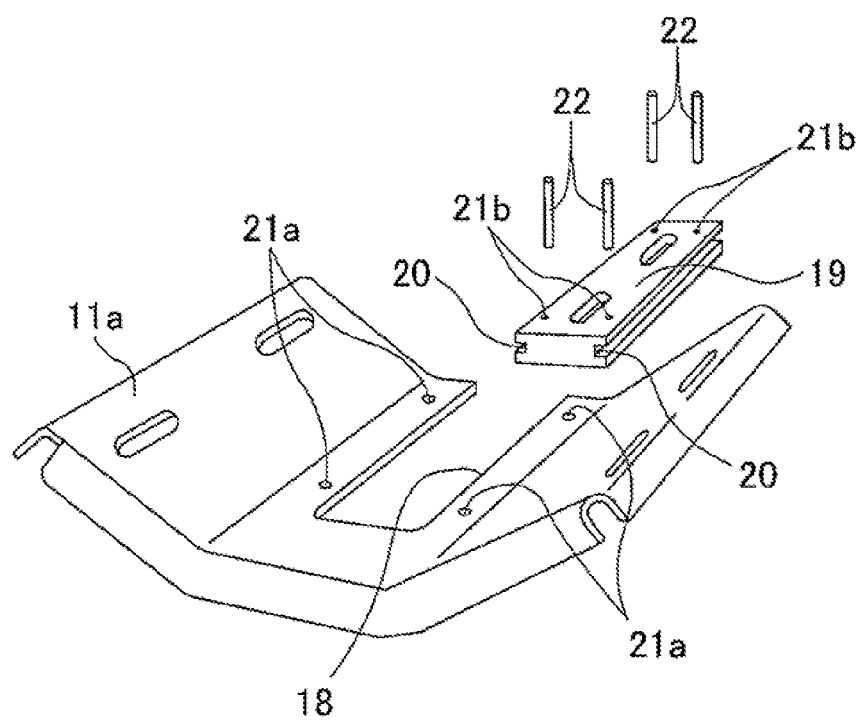
FIG. 23 is a perspective view of the construction in FIG. 21 in which the connecting pins are depicted instead of the steering column omitted.

FIG. 1 to FIG. 7 illustrate a first embodiment of the present invention. This example illustrates the case of applying the present invention to a tilting and telescopic type steering apparatus that comprises a tilting mechanism for adjusting the up/down position of the steering wheel 1 (see FIG. 17) and a telescopic mechanism for adjusting the forward/backward position of the steering wheel 1. In other words, in order to construct the telescopic mechanism, a telescopic shaped steering column 6c that can expand or contract along the entire length by fitting the rear section of an inner column 27 on the front side inside the front section of an outer column 28 on the rear side is used. A steering shaft 5b is supported on the inner diameter side of the steering column 6c such that it can be rotated freely.

The steering shaft 5b is made to be able to transmit torque as well as expand and contract by a spline fit between a male spline section that is formed around the rear section of a rod shaped inner shaft that is located on the front side, and a female spline section that is formed on the front section of a cylindrical shaped outer shaft 25 that is located on the rear side. With the rear end section of the outer shaft 25 protruding in the backward direction from the opening on the rear end of the outer column 24, the outer shaft 25 is supported on the inner diameter side of this outer column 24 by a bearing such as a single-row deep groove type ball bearing 26 that is capable of supporting both a radial load and a thrust load such that only the rotation is possible. The steering wheel 1 is fastened to and supported by the rear end section of the outer shaft 25. When adjusting the forward/backward position of the steering wheel 1, the outer shaft 25 and the outer column 24 are displaced in the forward/backward direction, and the steering shaft 5b and steering column 6c are expanded or contracted.

A housing 10a for housing a reduction gear and the like of an electric power steering apparatus is connected and fastened to the front end section of the inner column 23 of this steering column 6c. An electric motor 27, which is the auxiliary power source for the electric power steering apparatus, and a controller 28 for controlling the flow of electricity to this electric motor 27 are fastened to and supported by the top surface of the housing 10a. The housing 10a is supported by the vehicle body such that it can swivel around a horizontal shaft. In order for this, in this embodiment, a support cylinder 29 is provided in the left/right direction on the upper front end of the housing 10a, and the front end section of the steering column 6c is supported by the vehicle body by a horizontal shaft such as a bolt that is inserted through a center hole 30 in the support cylinder 29 such that the rear end of this steering column 6c can swivel in the raising or lowering direction.

The inner diameter of the front half of the outer column 24 which constitutes the middle section and rear section of the steering column 6c can expand or contract elastically. In order for this, a slit 31 is formed in the axial direction on the bottom surface of the outer column 24. The front end section of this slit 31 opens up to a through hole in the circumferential direction that is formed on the edge of the front end of the outer column 24 or in the portion near the front end section of the outer column 24 except the top end section. A pair of thick plate-shaped supported plate sections 32 is located in the portion between both sides in the width direction of the slit 31. These supported plate sections 32 displace together with the outer column 24 when adjusting the position of the steering wheel 1, and function as brackets on the displacement side.

In the case of this embodiment, the supported plate sections 32 are supported by a bracket 33 on the column side such that adjustment of the up/down position and forward/backward position is possible. This bracket 33 on the column side is normally supported by the vehicle body, however, during a collision accident, breaks away in the forward direction due to the impact of a secondary collision, which allows displacement in the forward direction of the outer column 24. In order for this, the bracket 33 on the column side is supported by a bracket 11 on the vehicle side such that it can break away in the forward direction due to an impact load that is applied during a secondary collision.

With the steering wheel 1 held in the adjusted position, the supported plate sections 32 are held more firmly by a pair of left and right support plate sections 34 of the bracket 33 on the column side. Long holes 35 in the up/down direction having a partial arc shape that are centered around the horizontal shaft that supports the support cylinder 29 with respect to the vehicle body are formed in these support plate sections 34, and long holes 36 in the forward/backward direction that are long in the axial direction of the outer column 24 are formed in the supported plate sections 32. An adjustment rod 37 is inserted through these long holes 35, 36. A head section 38 that is formed on the base end section (right end section in FIG. 5) of this adjustment rod 37 engages with the long hole in the up/down direction that is formed in one of the support plate sections 34 (right support plate section in FIG. 5) to prevent rotation, and only allows displacement along this long hole 35 in the up/down direction. On the other hand, a cam apparatus 42 having a driving cam 40 and a driven cam 41 is provided between the nut 39 that is screwed onto the tip end section (left end section in FIG. 5) of the adjustment rod 37 and the outside surface of the other support plate section 34 (left support plate section in FIG. 5). Of these cams, the driving cam 40 can be rotated and driven by an adjustment lever 43.

When adjusting the position of the steering wheel 1, the driving cam 40 is rotated and driven by rotating the adjustment lever 43 in a specified direction (downward), shortening the dimension in the axial direction of the cam apparatus 42. This widens the space between the inside opposing surfaces of the driven cam 41 and the head section 38, and releases the holding force that the support plate sections 34 apply to the supported plate sections 32. At the same time, the inner diameter of the portion on the front section of the outer column 24 in which the rear section of the inner column 23 is fitted elastically expands, which lowers the contact pressure that acts in the area of contact between the inner circumferential surface on the front section of the outer column 24 and the outer circumferential surface on the rear section of the inner column 23. In this state, the up/down position and the forward/backward position of the steering wheel 1 can be adjusted within the range in which the adjustment rod 37 can be displaced between the long holes 35 in the up/down direction and the long holes 36 in the forward/backward direction.

After the steering wheel 1 has been moved to a desired position, the dimension in the axial direction of the cam apparatus 42 is expanded by rotating the adjustment lever 43 in the opposite direction (upward) of the specified direction above. As a result, the space between opposing inside surfaces of the driven cam 41 and the head section 38 is shortened, and the supported plate sections 32 are held firmly by the support plate sections 34. At the same time, the inner diameter of the portion on the front section of the outer column 24 in which the rear section of the inner column 23 is fitted elastically contracts, and the contact pressure acting at the area of contact between the inner circumferential surface of the front section of the outer column 24 and the outer circumferential surface of the rear section of the inner column 23 increases. In this state, the steering wheel 1 is held in the adjusted up/down and forward/backward positions.

In this example, in order to increase the supporting force for holding the steering wheel 1 in the adjusted position, friction plate units 44 are held between the inside surfaces of the support plate sections 34 and the outside surfaces of the supported plate sections 32. These friction plate units 44 are formed by alternately overlapping one of a plurality of first friction plates having long holes that are aligned with the long holes 35 in the up/down direction, and one of a plurality of second friction plates having long holes that are aligned with the long holes 36 in the forward/backward direction, and serve the purpose of increasing the supporting force by increasing the friction area. The detailed construction and function of this kind of friction plate unit 44 is known from JP2009-196562(A) and JP2000-6821(A), and is not related to the gist of the present invention, so a detailed drawing and explanation are omitted.

Furthermore, the bracket 33 on the column side breaks away in the forward direction with respect to the bracket 11 on the vehicle side due to the impact load of a secondary collision, however, it is supported so that it cannot drop downward even as the secondary collision advances. The bracket 11 on the vehicle side is fastened to and supported by the vehicle body, and does not displace in the forward direction during a secondary collision, and this bracket is formed by using a press to punch and bend metal plate, such as steel plate, having sufficient strength and rigidity. By bending the edges on both sides and the edge on the rear end downward, the bending rigidity of this kind of bracket 11 on the vehicle side is improved, and this bracket 11 on the vehicle side comprises a locking hole (locking notch) 45 that is open on the edge on the front end in the center section in the width direction, and a pair of installation holes 46 that are located on the rear section of the bracket 11 on the vehicle side on both the left and right sides of the locking hole 45. The locking hole 45 is covered by the locking capsule 47 and extends to near the rear end section of the bracket 11 on the vehicle side. This kind of bracket 11 on the vehicle side is supported by and fastened to the vehicle body by bolts or studs that are inserted though the installation holes 46. In the case of this example, the locking hole 45 is formed as a notch that is open on the edge on the front end, however, the shape of the locking hole 45 is not limited to this, and could be a closed hole that extends in the axial direction of the steering column 6d and that is closed on the edge on the front end, and is such that it prevents the locking capsule 47, 47a from dropping from the bracket 11 on the vehicle side.

The bracket 33 on the column side is connected to the bracket 11 on the vehicle side by way of the locking capsule 47, 47a so that it can break away in the forward direction during a secondary collision. The locking capsule 47 having the construction illustrated in FIG. 7A (first example), or the locking capsule 47a having the construction illustrated in FIG. 7B (second example) can be used.

In the construction of the first example of the first embodiment illustrated in FIG. 7A, the shape of the locking capsule 47 is simple, which makes it possible to suppress manufacturing costs, as well as keep the assembly height of the portion where this locking capsule 47 is installed low. This kind of construction is advantageous from the aspect that the steering column support apparatus can be made more compact and lightweight, and that by shortening the distance between the center axis of the outer column, which is the position where the impact load acts, and the engagement section between the bracket 11 on the vehicle side and the locking capsule 47, which is the portion that breaks away during a secondary collision, the break away load of the engagement section can be stabilized and torsion that occurs when this length becomes long can be suppressed.

On the other hand, the construction of the second example of the first embodiment illustrated in FIG. 7B is advantageous from the aspect of simplifying the injection molding for forming locking pins 50, 50a, which are the connecting members. In other words, in the case of the construction in FIG. 7A, when performing injection molding of the locking pins 50, 50a, the injection molding is performed with the bracket 11 on the vehicle side, the locking capsule 47 and the bracket 33 on the column side connected by bolts 51 and nuts 52. However, in the case of the construction in FIG. 7B, only the bracket 11 on the vehicle side and the locking capsule 47a need to be set in the die for performing injection molding of the locking pins 50, 50a, so it becomes easier to make the metal die more compact. In other words, the locking capsule 47a has locking grooves 53 that are formed on the surfaces of both the left and right sides, and the edges of both sides of the locking hole 45 of the bracket 11 on the vehicle side engage with these locking grooves 53. Therefore, the bracket 11 and locking capsule 47a are connected by the locking pins 50, 50a, after which the locking capsule 47a can be connected and fastened to the bracket 33 on the column side by the bolts 51 and nuts 52. In the following, the first embodiment is explained using the construction of the second example that uses this locking capsule 47a as an example, however, needless to say the present invention can also be suitably applied to the construction of the first example.

This locking capsule 47a is formed as a single member by plastic working such as forging of a metallic material such as an aluminum alloy, mild steel or the like, die casting a light alloy such as an aluminum alloy or magnesium alloy, or injection molding of a high strength high functional polymer such as polyacetal. The width dimension in the left and right direction and the length dimension in the forward and backward direction are larger in the upper half section than in the lower half section, locking grooves 53 are formed on the surfaces of both the left and right sides of the locking capsule 47a, and a flange sections 48 that protrudes toward both sides and toward the rear is formed on the upper half section and lower half section of the surfaces on both the left and right sides and the rear.

In this example, the back end section (rear end section) of the locking hole 45 that is formed in the bracket 11 on the vehicle side is sloped in a direction where the width becomes more narrow going toward the edge of the back end. The shape of the bottom surface of the locking groove 53 that is formed around the outer surface of the locking capsule 47a except for the surface on the front end is a shape that mostly coincides with the locking hole 45. More specifically, the shape of this bottom surface is similar to the shape of the locking hole 45, with the width dimension being a little smaller. Small through holes 49a, 49b on the capsule side are formed at a plurality of locations in the flange section 48 of the upper half section that exists above the locking grooves 53, such that they pass through the upper surface of the locking capsule 47a and the inner surface of the locking groove 53 which corresponds to an inner surface of the top end of the locking capsule. The small through holes 49a, 49b on the capsule side are formed at a total of eight locations in the example in the figure.

On the other hand, small notch sections 55a, 55b, which are receiving sections on the bracket side, are formed at a plurality of locations in the bracket 11 on the vehicle side in the portion that surrounds the locking hole 45, such that they pass through the top and bottom surfaces of the bracket 11 on the vehicle side. The small notch sections 55a, 55b and the small through holes 54 are formed at a total of eight locations respectively in the example in the figure. Moreover, the small notch sections 55a, 55b of the receiving section on the bracket side, and the small through holes 54 may be concave sections that are open with the bottom being closed.

In the construction of this example, the small notch sections 55b and the small through holes 54 are provided at locations where they are aligned with part of the small through holes 49 on the capsule side when the locking capsule 47a is pushed to the back of the locking hole 45. On the other hand, the small notch sections 55a are located at locations that connect with the other part of the small through holes 49 on the capsule side.

Figure 1A:
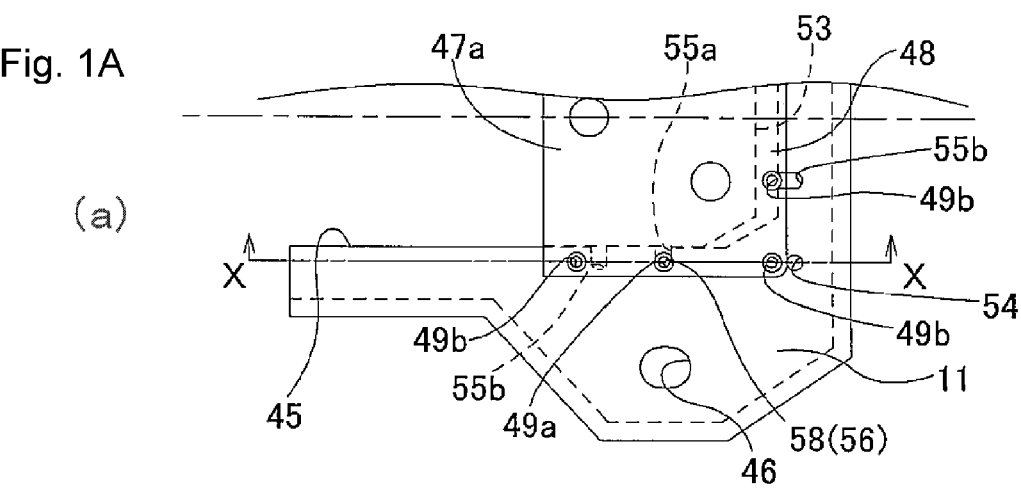
FIG. 1A and FIG. 1B are drawings illustrating first process (A) and second process (B) in performing injection molding of synthetic resin in a first example of a first embodiment of the present invention, where (a) is a partial top view of the bracket on the vehicle side and the locking capsule, and (b) is a cross-sectional view of section X-X.
Figure 1A:
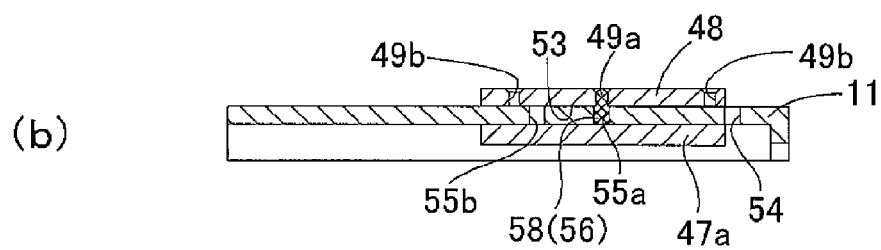

In the present invention, when assembling the steering column support apparatus having the construction described above, first, as illustrated in FIG. 1, the locking capsule 47a is fitted on the inside of the locking hole 45 that is formed in the bracket 11 on the vehicle side. Next, the locking groove 53 that is formed in the outer surface around the locking capsule 47a is fitted with the edge around the locking hole 45 that is formed in the bracket 11 on the vehicle side. Then, as illustrated in FIG. 1A, the locking capsule 47a is pushed toward the back of the locking hole 45. However, the locking capsule 47a is not pushed all the way to the back end section as in the completely assembled state, but is pushed back such that the positional relationship between the locking capsule 47a and the bracket 11 on the vehicle side is a little shifted from the completely assembled state. In this state, of the small through holes 49a, 49b on the capsule side and the small notch sections 55a, 55b, part of the small though holes 49a and part of the small notch sections 55a are aligned with each other. In this state, by performing injection molding of injecting synthetic resin 56 inside the small through holes 49a on the capsule side and the small notch sections 55a, pin shaped members 58 made of synthetic resin 56 span between these small through holes 49a on the capsule side and the small notch sections 55a.

Figure 1B:
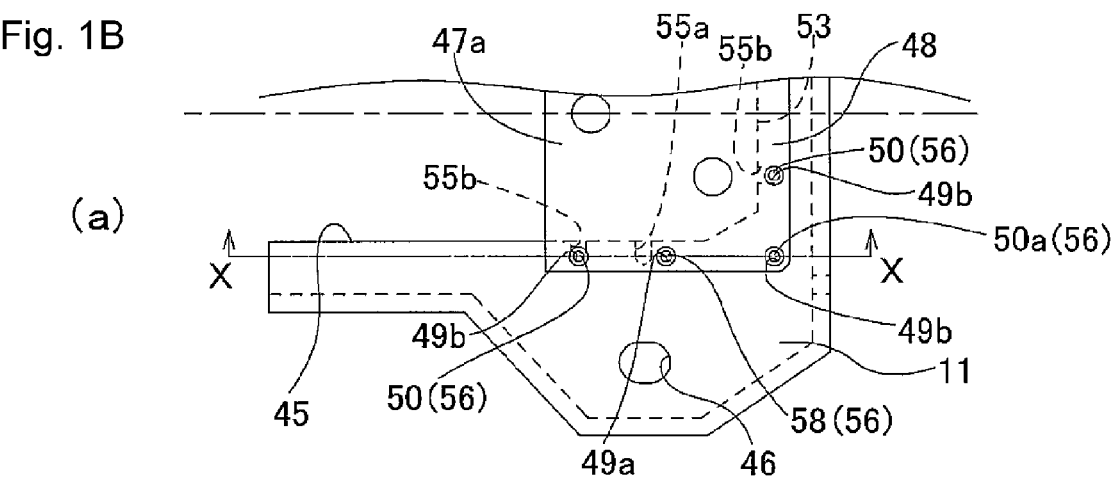
Figure 1B:
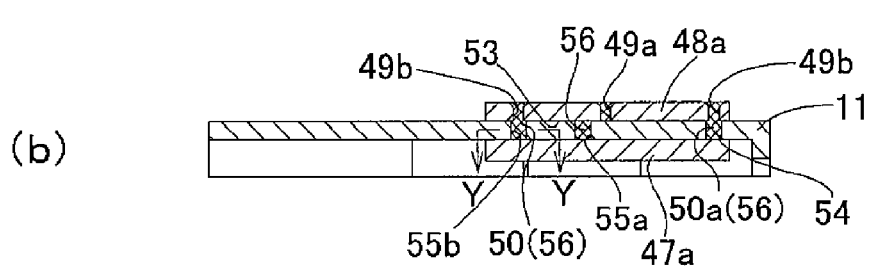

After the pin shaped members 58 have been formed by the synthetic resin 56 cooling and solidifying, the locking capsule 47a is pushed all the way to the back end section of the locking hole 45, which is the completely assembled state, shearing the pin shaped members 58 as illustrated in FIG. 1B. In this state, of the small through holes 49a, 49b on the capsule side, and the small notch sections 55a, 55b, the remaining small through holes 49b on the capsule side, the remaining small notch sections 55b and the small through holes 54 on the bracket side are aligned. In this state, synthetic resin 56 is injected into the small through holes 55b on the capsule side, the small notch sections 55b and the small through holes 54 on the bracket side, to form locking pins 50, 50a made of synthetic resin 56 as connecting members that span between the small through holes 49b on the capsule side, the small notch sections 55b and the small through holes 54 on the bracket side. In this state, the locking capsule 47a is connected to and supported by the bracket 11 on the vehicle side such that it can break away in the forward direction due to an impact load that is applied during a secondary collision. In other words, by the locking pins 50, 50a shearing during a secondary collision, the locking capsule 47a is allowed to displace in the forward direction together with the steering column.

Moreover, the sheared surfaces of the sheared pin shaped members 58, which spanned between part of the small through holes 49a and the small notch sections 55a and that were sheared when the locking capsule 47a was pushed all the way back to the back end section of the locking hole 45, elastically come in contact with the top surface of the bracket 11 on the vehicle side or the inside surface of the locking groove 53a. In other words, in the process of shearing these pin shaped members 58 as the locking capsule 47a was pushed back, these pin shaped members 58 were stretched in the direction of shear. After being sheared, this stretched portion is wedged in between the inner surface of the locking groove 53 that is formed on the locking capsule 47a side and the top surface of the bracket 11 on the vehicle side. Therefore, of the bracket 11 on the vehicle side, the edge around the locking hole 45 can be prevented from vibrating on the inside of the locking groove 53. As a result, rocking displacement of the steering column that is supported by the locking capsule 47a and the steering wheel that is supported by and fastened to the rear end section of the steering shaft that is supported on the inner diameter side of this steering column is suppressed, making it possible to lessen the discomfort given to the driver.

Figure 2:
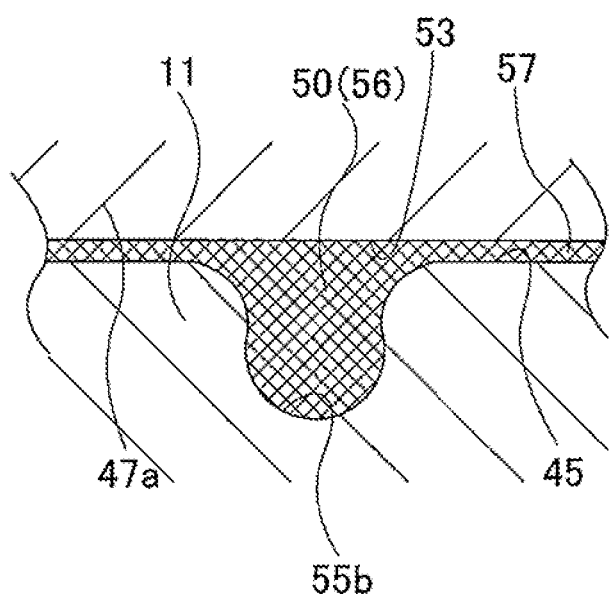
FIG. 2 is an enlarged cross-sectional view of section Y-Y in FIG. 1(B)(b).
Figure 3:
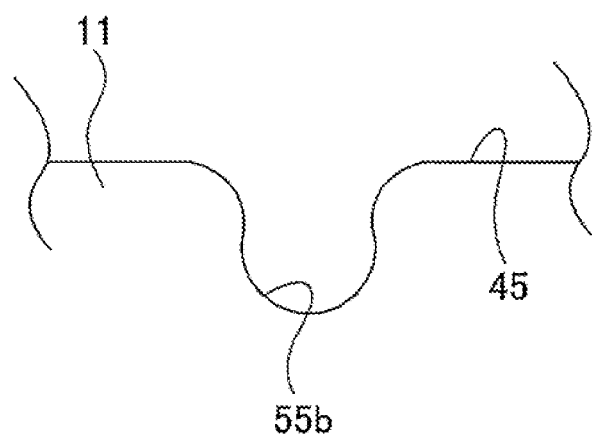
FIG. 3A is a partial top view of a small notch section that is formed in the first example of the first embodiment of the invention.
FIG. 3B is a partial top view of an alternative through hole of another example.
Figure 3:
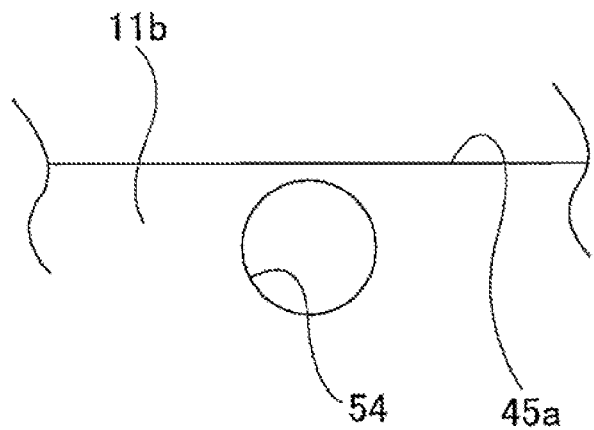
Figure 4:
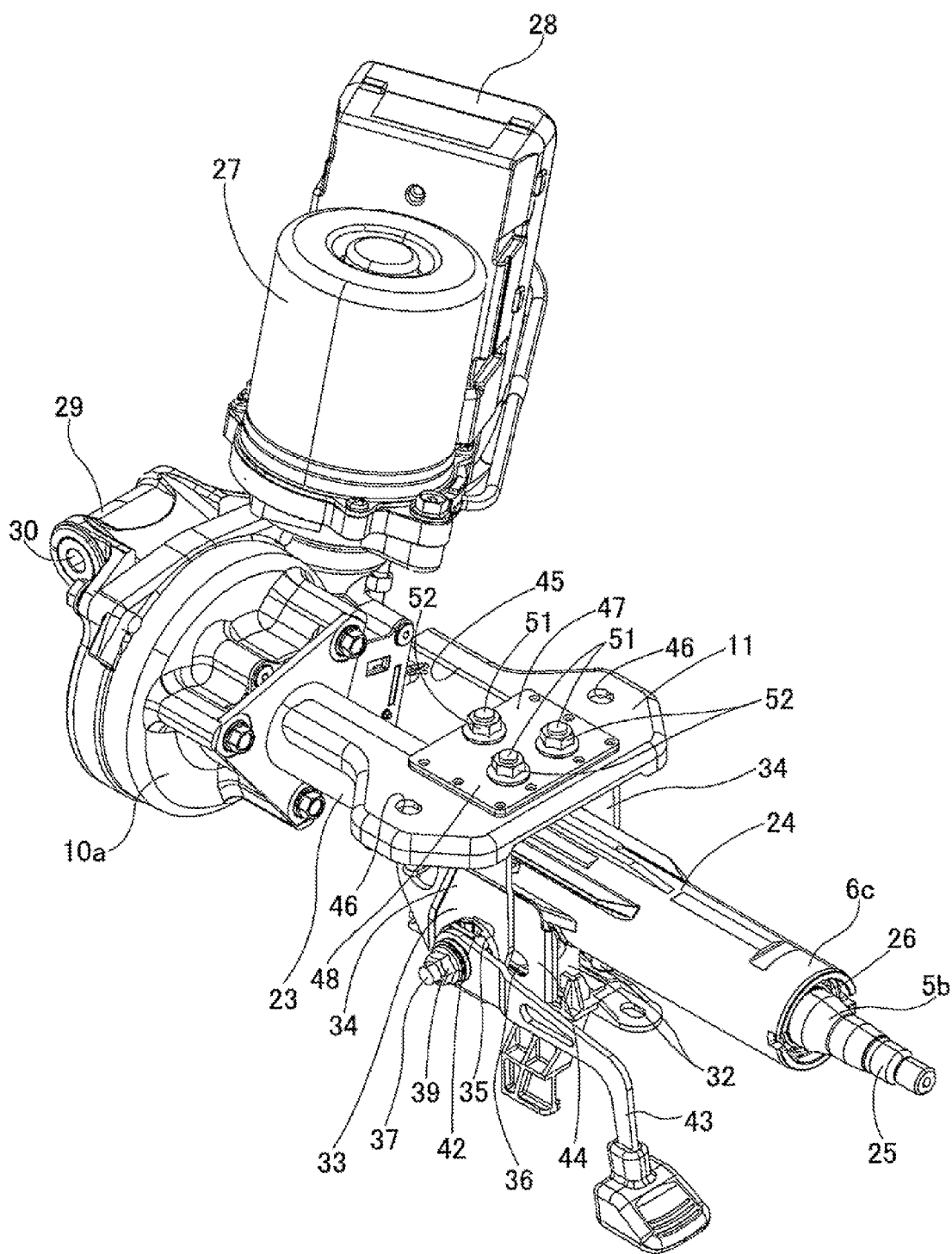
FIG. 4 is a perspective drawing illustrating an example of a steering apparatus to which the steering column support apparatus of the first example of the first embodiment of the invention is applied, and illustrates the state as seen from the upper rear.
Figure 5:
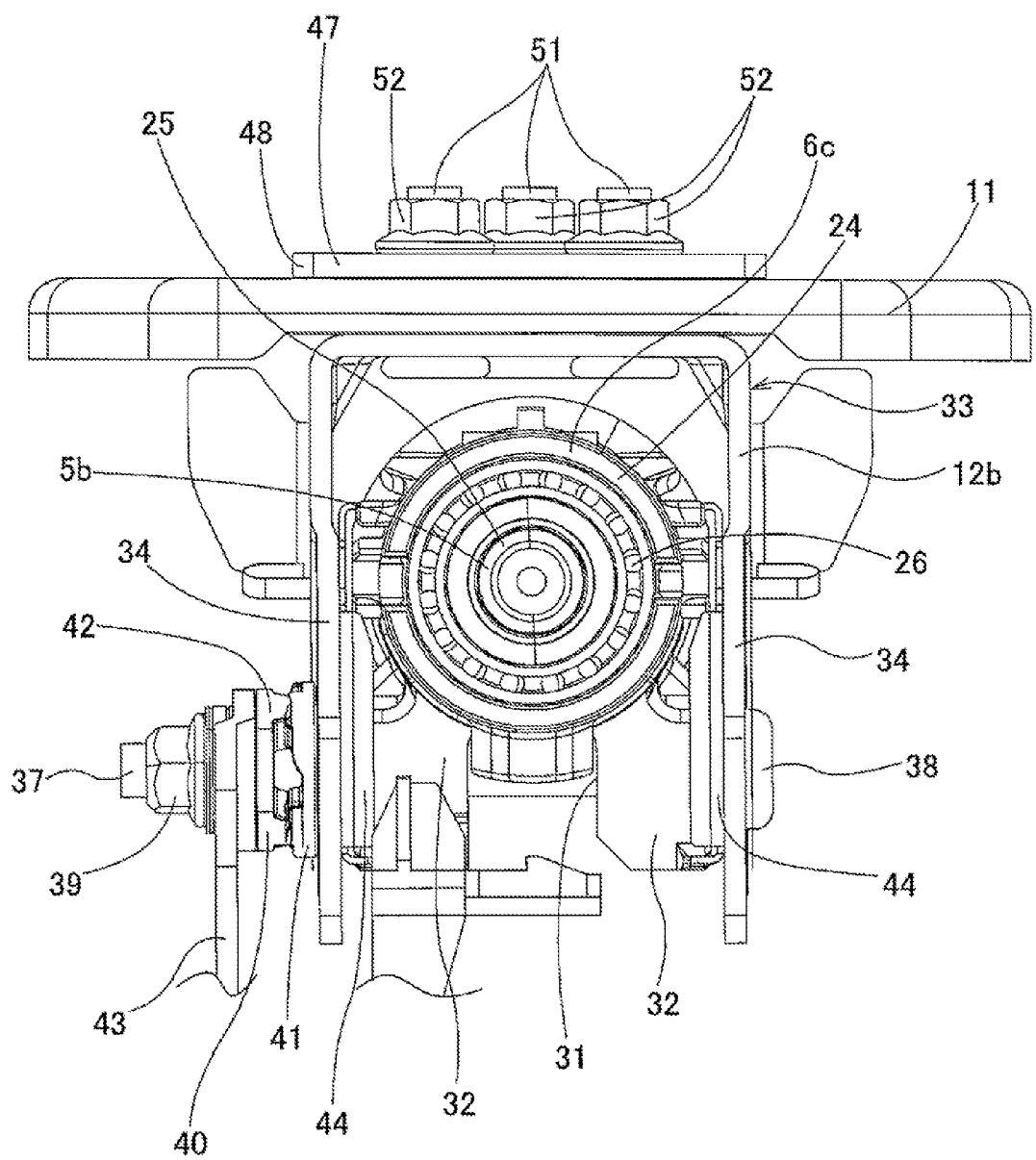
FIG. 5 is an orthographic drawing illustrating the construction in FIG. 4 with part omitted, and illustrates the state as seen from the rear.
Figure 6:
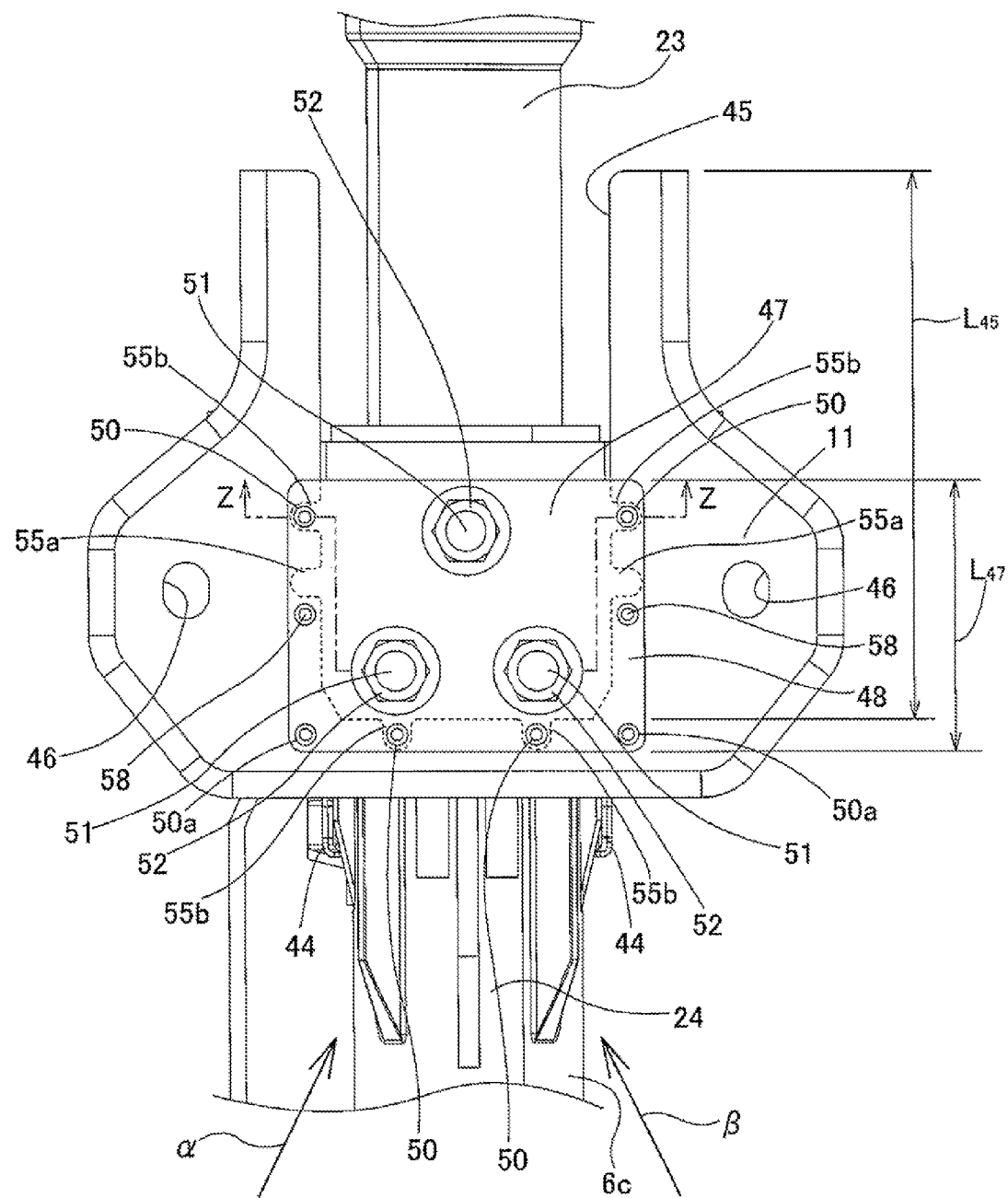
FIG. 6 is a top view as seen from above part of the construction in FIG. 4.

Furthermore, in the case of this example, in the state illustrated in FIG. 1B, when injecting synthetic resin 56 inside the small through holes 49b on the capsule side and the small notch sections 55b so that locking pins 50 span between the small through holes 49b on the capsule side and the small notch sections 55b, part of this synthetic resin 56 penetrates into a small space 57 such as illustrated in FIG. 2 that exists between the inside edge of the locking hole 45 and the bottom surface of the locking groove 53. The synthetic resin 56 is fed inside the small notch sections 55 by way of the small through holes 49b on the capsule side, however, these small notch sections 55b are open to the inside of the locking hole 45. Therefore, the synthetic resin 56 that was fed inside the locking hole 45 penetrates into the small space 57 along part or the entire length of the small space 57, and allowed to cool and solidify inside the small space 57. Flow of the synthetic resin 56 from the small notch sections 55b into this small space 57 is performed smoothly. In other words, as illustrated in FIG. 3B, when small through holes 54 that are independent of the locking hole 45 are formed in part of the bracket 11 on the vehicle side, it is difficult for a sufficient amount of synthetic resin 56 to be fed into the small space 57. However, in the case of this example, the small notch sections 55b are open to the inside of the locking hole 45 as illustrated in FIG. 3A, so a sufficient amount of synthetic resin is fed inside the small space 57.

Figure 7:
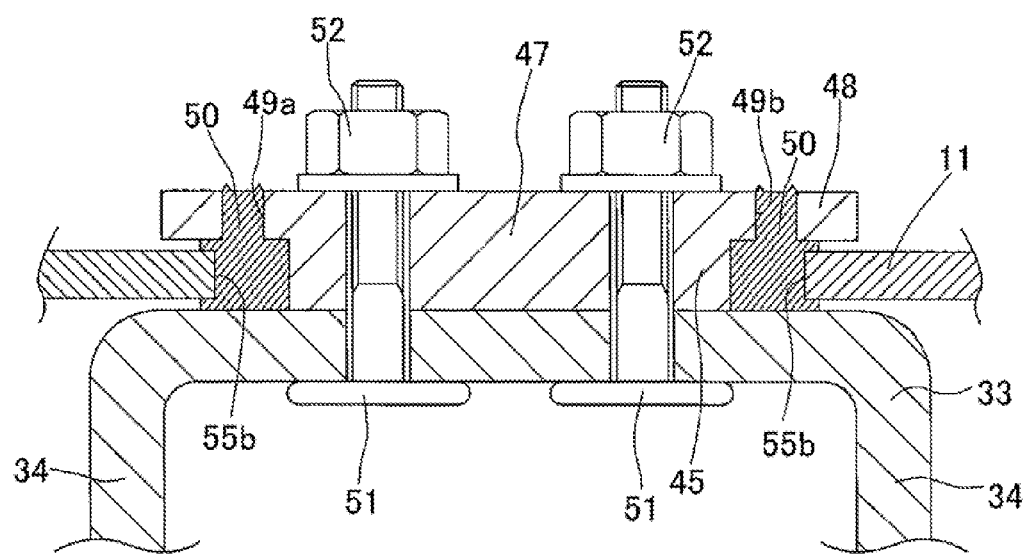
FIG. 7A illustrates a first example of the construction in FIG. 4 of the connecting section between the bracket on the vehicle side and the bracket on the column side, and is an enlarged cross-sectional view of section Z-Z in FIG. 6.
FIG. 7B is the same as FIG. 7A, but illustrates a second example.
Figure 7:
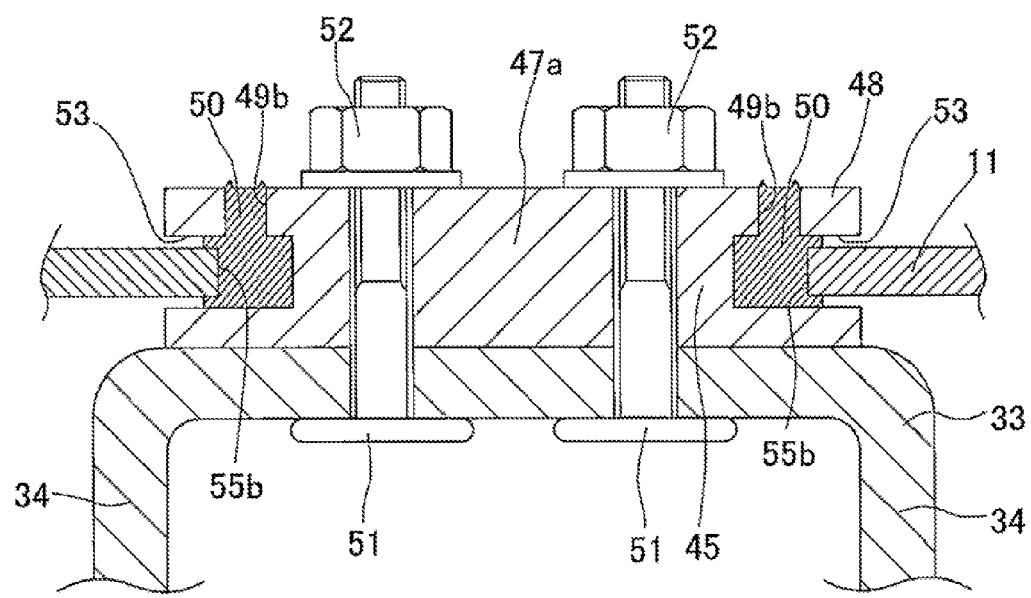

As described above, preferably small notch sections 55a, 55b are formed in at least part of the receiving section on the side of the bracket of the bracket 11 on the vehicle side, however it is also possible to form the receiving section on the side of the bracket with only small through holes 54 as illustrated in FIG. 3B. In this case as well, the effect of the shear of the pin shaped members 58 is obtained. Moreover, in this example, pin shaped members 58 and the locking pins 50, 50a, which are the connecting member, are formed using injection molding of synthetic resin, however, it is also possible to pressure fit pins made of a synthetic resin or light metal alloy that were formed into a solid cylindrical shape beforehand into the small through holes 49a, 49b on the capsule side and the small through holes 54 on the bracket side by pressing the pins with a large force in the axial direction, such that these pins span between these holes. Whether using synthetic resin or pressure fitted pins, in this case part of the synthetic resin material or part of the light metal alloy material used for the pin shaped members 58 and locking pins 50, 50a enters into one or both of the spaces between the top and bottom surfaces of the bracket 11 on the vehicle side and the bottom surface of the flange sections 48 and the top surface of the bracket 33 on the column side. Therefore, even though there is a small space between these surfaces, it is possible to eliminate vibration of the installation section of the bracket 33 on the column side with respect to the bracket 11 on the vehicle side. From this aspect, formation of the locking pins 50, 50a by injection molding of synthetic resin is preferred. In FIG. 7, for clarity, the height of the space that is the cause of vibration is drawn larger than the actual height.

When part or all of the locking pins 50, 50a are formed by pressure fitting of light metal alloy or synthetic pins instead of by injection molding, the portion in the middle section in the axial direction of the pins that corresponds to the space spreads outward in the radial direction due to the axial force that is applied to the pins, and this material inside the space can eliminate vibration.

In the steering column support apparatus that is made according to the assembly method of this example, tuning for stabilizing forward displacement of the steering wheel during a secondary collision is simplified, and by eliminating the vibration in the connecting section between the locking capsule 47a and the bracket 11 on the vehicle side, it is possible to lessen discomfort given to the driver that operates the steering wheel. Furthermore, in the steering column support apparatus that is made according to the assembly method of this example, the load required for the locking capsule 47a that is supported by the steering column by way of the bracket on the column side to come out in the forward direction from the locking hole 45 that is formed in the bracket 11 on the vehicle side can be kept low.

Particularly, synthetic resin 56 is filled into the small space 57 that exists between the inside edges of the locking hole 45 and the bottom surface of the locking groove 53 that is formed on the outer surface around the locking capsule 47a, so direct rubbing between the inside edges and the bottom surface can be prevented. Therefore, when both the bracket 11 on the vehicle side and the locking capsule 47a are made of metal, there is no strong rubbing between metallic materials when the capsule 47a displaces in the forward direction inside the locking hole 45 during a secondary collision. As illustrated by α and β in FIG. 6, even when a large force in a forward diagonal direction is applied from the steering wheel to the locking capsule 47a, it is possible to cause the locking capsule 47a to smoothly displace in the forward direction inside the locking hole 45, and thus completely protect the driver. In the case of this example, the shape of the locking hole 45 and the bottom surface of the locking groove 53 is such that the width dimension becomes smaller going toward the rear, so it becomes even easier for the locking capsule 47a to displace in the forward direction inside the locking hole 45, and thus it becomes even more possible to completely protect the driver during a collision accident. However, the shape of the locking hole 45 and both surfaces of the locking groove 53 are not limited to this shape, and the present invention can also be applied to the case wherein the dimensions in the width direction are constant going toward the rear.

In the case of this example, the break away load during a secondary collision, or in other words the load required to cause the locking capsule 47a to displace in the forward direction with respect to the bracket 11 on the vehicle side changes according to the pushing force that corresponds to the pushing load required when pushing the locking capsule 47a to the back section of the locking hole 45, in other words, from the state illustrated in FIG. 1A to the state illustrated in FIG. 1B, and also changes according to the injection pressure when injecting synthetic resin inside the remaining through holes 49b on the capsule side, the small notch sections 55b and the small through holes 54, in other words, the amount of synthetic resin 56 that flows inside the small space 57. However, of these, the injection pressure can be adjusted as desired, however, the pushing load easily varies among products. Therefore, in this example, preferably the pushing load is measured, and a uniform break away load during secondary collision is obtained by changing the injection pressure according to the size of this pushing load.

This locking capsule 47a is connected and fastened to the bracket 33 on the column side by a plurality bolts 51 and nuts 52 (three in the example in the figure) so that they do not separate regardless of any impact load. In other words, by inserting bolts 51 from the bottom through the through holes that are formed in aligned positions in the locking capsule 47a and bracket 33 on the column side, and then screwing nuts 52 onto the portions on the tip end sections (top end sections) of the bolts 51 that protrude from the top surface of the locking capsule 47a, and tightening the nuts 52, the locking capsule 47a and the bracket 33 on the column side are connected and fastened together. Therefore, during a secondary collision, the impact load that is transmitted from the outer column 24 to this bracket 33 on the column side is transmitted as is to the locking capsule 47a, and when the locking pins 50, 50a shear, the outer column 24 also displaces in the forward direction in synchronization with the displacement in the forward direction of the locking capsule 47a.

The length $L_{45}$ in the forward/backward direction of the locking hole 45 that locks the locking capsule 47a that displaces in the forward direction together with the outer column 24 during a secondary collision in this way is sufficiently larger than the length $L_{47}$ in the same direction of the locking capsule 47a ($L_{45} >> L_{47}$). In the case of this embodiment, length $L_{45}$ of the locking hole 45 is kept at two times greater or more than the length $L_{47}$ of the locking capsule 47a ($L_{45} \geq 2L_{47}$). During a secondary collision, even when the locking capsule 47a has displaced completely forward together with the outer column 24, in other words, even when the locking capsule 47a has stopped displacing in the forward direction due to the impact load that was applied from the steering wheel 1, the portion of at least the rear end section of the flange section 48 of the locking capsule that is capable of supporting the weight of the steering column 6c and bracket 33 on the column side does not come out completely from the locking hole 45. That is, even when the secondary collision has advanced, the rear end section of the flange section 48 that is formed on the upper half section of the portions on both sides in the width direction of the locking capsule 47a is positioned on the top side of the front end section of the bracket 11 on the vehicle side, and is able to prevent the locking capsule 47a from dropping down. This makes it possible to easily operate the steering wheel 1 even after an accident, for example, in the case that a vehicle that was in an accident can move on its own power, that vehicle can be easily operated when moving the vehicle under its own power to the side of the road after the accident.

Furthermore, with the construction of the steering column apparatus of the present invention, tuning for stabilizing forward displacement of the steering wheel 1 in the forward direction during a secondary collision is simple, and when the secondary collision has advanced, it is possible to prevent the steering wheel 1 from excessive up or down displacement.

First, simplification of the tuning for stabilizing the forward displacement of the steering wheel 1 during a secondary collision is achieved by having the bracket 11 on the vehicle side and the locking capsule 47, 47a engage only in the center section in the width direction of this bracket 11 on the vehicle side. In other words, by placing a single locking capsule 47, 47a in the portion directly above the outer column 24, the impact load that is applied to the locking capsule 47, 47a from the steering wheel 1 via the outer shaft 25 and outer column 24 during a secondary collision is evenly applied to the plurality of locking pins 50, 50a that connect the locking capsule 47, 47a and the bracket 11 on the vehicle side. That is, the impact load essentially acts on the center section of the locking capsule 47, 47a in the axial direction of the outer column 24. A force is applied in a direction that causes the single locking capsule 47, 47a to come out in the forward direction from the locking hole 45. Therefore, the locking pins 50, 50a that connect this locking capsule 47, 47a and the bracket 11 on the vehicle side essentially shear at the same time. As a result, the displacement in the forward direction of the outer column 24 that is connected to the locking capsule 47, 47a by way of the bracket 33 on the column side is performed stably without excessive inclination of the center axis.

Particularly, in the case of this embodiment, a friction plate unit 44 for increasing the support force for holding the steering wheel 1 at an adjusted position is provided together with a tilting and telescopic mechanism for adjusting the up/down position and forward/backward position of the steering wheel 1. Providing the tilting and telescopic mechanism and the friction plate unit 44 are a cause for making it easy for large variation to occur in the break away load during a secondary collision due to an accumulation of manufacturing errors, however in this embodiment, through the engagement between the single locking capsule 47, 47a and the bracket 11 on the vehicle side, variation in the break away load is suppressed. As a result, tuning for lessening the impact that is applied to the body of the driver that collides with the steering wheel 1 during a secondary collision is performed properly, and it becomes easier to more completely protect the driver. Moreover, an energy absorbing member that plastically deforms and absorbs impact energy due to displacement in the forward direction is provided between a portion that does not displace during a secondary collision, for example the bracket 11 on the vehicle side, and the portion that displaces in the forward direction due to a secondary collision, for example, the outer column 24. This energy absorbing member is also positioned in the center section in the width direction of the outer column 24 and effectively deforms plastically due to displacement in the forward direction of the outer column 24. Various known forms of this kind of energy absorbing member are disclosed (refer to JP10-86792(A)), however, because it is not related to the gist of the present invention, detailed drawings and an explanation are omitted.

[First Example of Second Embodiment]

Figure 8:
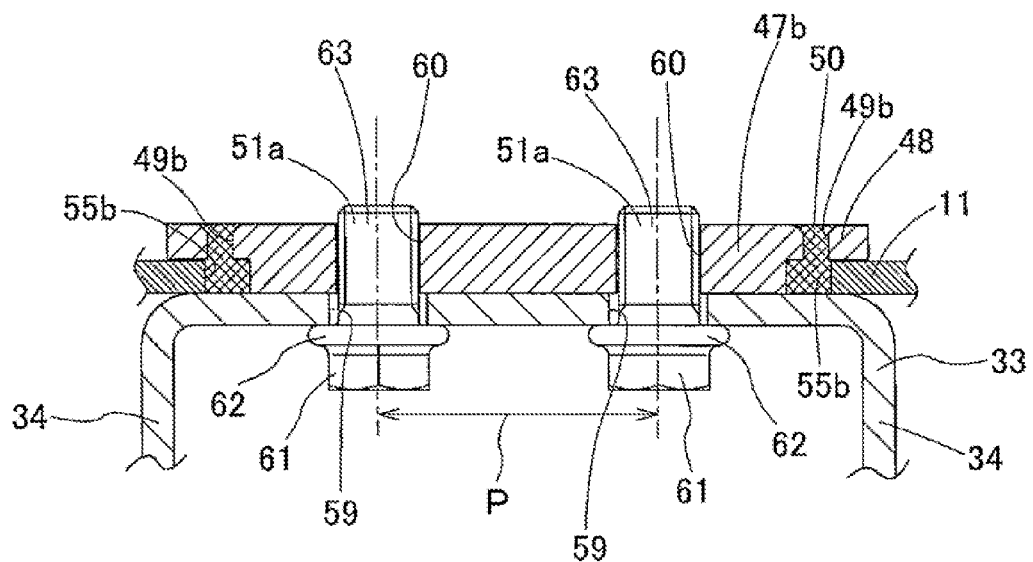
FIG. 8 is a cross-sectional view that is a cross-sectional view the same as FIGS. 7A, 7B and illustrates a first example of a second embodiment of the present invention.

FIG. 8 illustrates a first example of a second embodiment of the present invention, the construction and features of this example are that in order to simplify the construction of the connecting section between the locking capsule 47b and the bracket 33 on the column side, screw holes 60 are formed directly in the locking capsule 47b, thus eliminating the nuts 52 (FIG. 7A), and that of the three bolts 51a, the two bolts 51a near the rear are separated more than in the first embodiment. The construction and functions of other parts are basically the same as in the first embodiment, so explanations of identical parts are omitted or simplified, so that the explanation below centers on the features of this example.

The bracket 33 on the column side and the locking capsule 47b are connected and fastened by bolts 51a at three locations as in the first embodiment. The positional relation of these three bolts 51a is the same as that of the three bolts 51 and three nuts 52 in the first embodiment, and the three bolts 51a are located at two locations near the rear of the locking capsule 47b and nearer to both ends in the width direction than the center section, and one location in the center section near the front, for a total of three locations. However, the two bolts near the rear are located even nearer to both ends than in the first embodiment. In order to locate these bolts 51a in these three locations, through holes 59 are formed at these three positions in part of the bracket 33 on the column side, and screw holes 60 are formed at positions in the locking capsule 47b that are aligned with these through hole 59. The bolts 51a are inserted from the bottom through these through holes 59 and screwed into the screw holes 60, and tightened to connect and fasten together the locking capsule 47b and the bracket 33 on the column side.

In the construction of this example, spacers 62 are formed around the outer edge of the top end section of the head sections 61 of the bolts 51a such that they are integrated with the head sections 61. The outer diameters of these spacers 62 are a little larger than the diameters of the circumscribed circles of the head sections 61 and the inner diameters of the through holes 59. When the threaded sections 63 of the bolts 51a are screwed into screw holes 60, and further tightened, the top surfaces of the spacers 62 strongly press against the bottom surface of the bracket 33 on the column side. In other words, in this state, the portions of the bracket 33 on the column side surrounding the three through holes 59 are firmly held between the top surfaces of the spacers 62 and the bottom surface of the locking capsule 47b.

With the construction of this example constructed as described above, as in the first embodiment, tuning for stabilizing displacement in the forward direction due to a secondary collision can be performed simply, as well as it is possible to make the apparatus more compact and low cost and maintain design freedom. Furthermore, it is possible to increase the support rigidity of the locking column with respect to the bracket on the column side.

In other words, because the screw holes 60 into which the three bolts 51a for connecting and fastening the bracket 33 on the column side and the locking capsule 47b are screwed are directly formed in the locking capsule 47b, there is no need for nuts on the top side of the locking capsule 47b. In other words, by taking advantage of the thickness (height dimension) of the locking capsule 47b, screw holes 60 having a sufficient length can be formed, so it is possible to suppress an increase in the assembly height due to nuts, and thus the apparatus can be made more compact. Moreover, lowering the cost and making the apparatus more compact makes it possible to maintain design freedom of the steering apparatus installation portion. In the case of this example, the thickness of the locking capsule 47b is relatively smaller than in the case of the second example of the first embodiment. Therefore, in order to maintain the strength of the screw sections of the screw holes 60 and the bolts 51a, preferably the locking capsule 47b will be made of a ferrous metallic material such as carbon steel.

Of the three bolts 51a, the two bolts 51a near the rear are separated in the width direction, so it is possible to increase the rigidity of the connection section between the locking capsule 47b and the bracket 33 on the column side against moments. Particularly, the improvement of this rigidity can be increased more the greater the pitch P is in the width direction of the through holes 59 and screw holes 60. In this example, in addition to maintaining this sufficient pitch P, spacers 62 are formed on part of the bolts 51a, so the same effect is obtained as when the pitch P is even further increased, and thus the moment rigidity can be further improved. This kind of effect can similarly be obtained even when spacers that are separate from the bolts 51a are held between the top surfaces of the head sections 61 of the bolts 51a and the bottom surface of the bracket 33 on the column side.

Furthermore, in the case of this example, the bolt 51a and the locking capsule 47b do not shift and move in the planar direction (forward/backward direction and width direction) of the locking capsule 47b. Therefore, even though the bolts 51a may become loose, shifting movement of the bracket 33 on the column side with respect to the bracket 11 on the vehicle side is only due to the space between the inner surfaces of the through holes 59 and the outer surfaces of the bolts 51a. Therefore, even though the bolts 51a may become loose, the amount of shifting movement of the bracket 11 on the column side can be kept small. Particularly, by eliminating the space between the inner surfaces of the through holes 59 and the outer surfaces of the threaded sections 63 of the bolts 51a, in other words, by using a light interference fit between the through holes 59 and the bolts 51a, not only does it become difficult for the bolts 51a to become loose, but even in that case that they became loose, the amount of shifting movement of the bracket 33 on the column side is essentially zero.

[Second Example of Second Embodiment]

Figure 9:
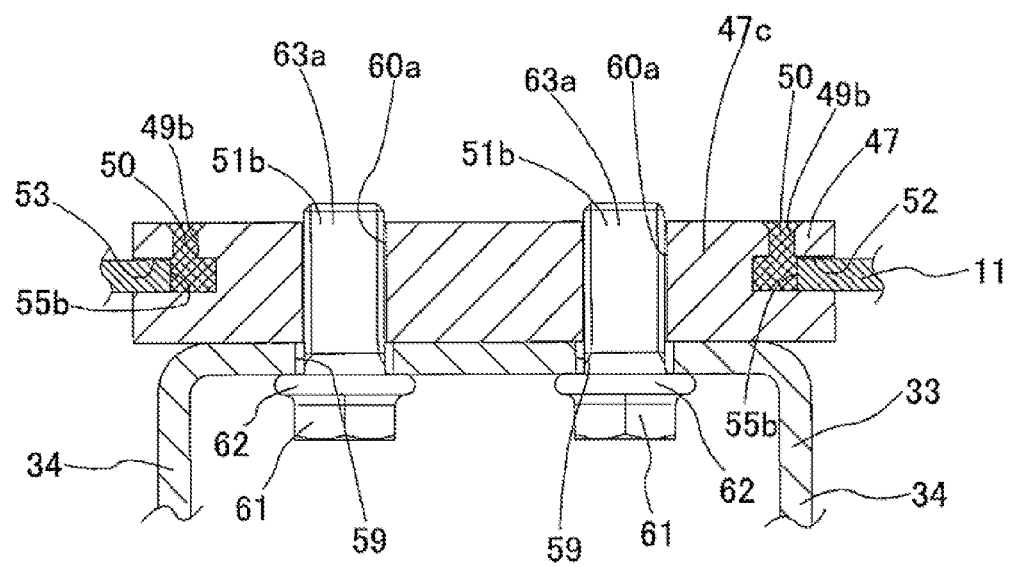
FIG. 9 is a cross-sectional view that is a cross-sectional view the same as FIG. 8 and illustrates a second example of the second embodiment of the present invention.
Figure 10:
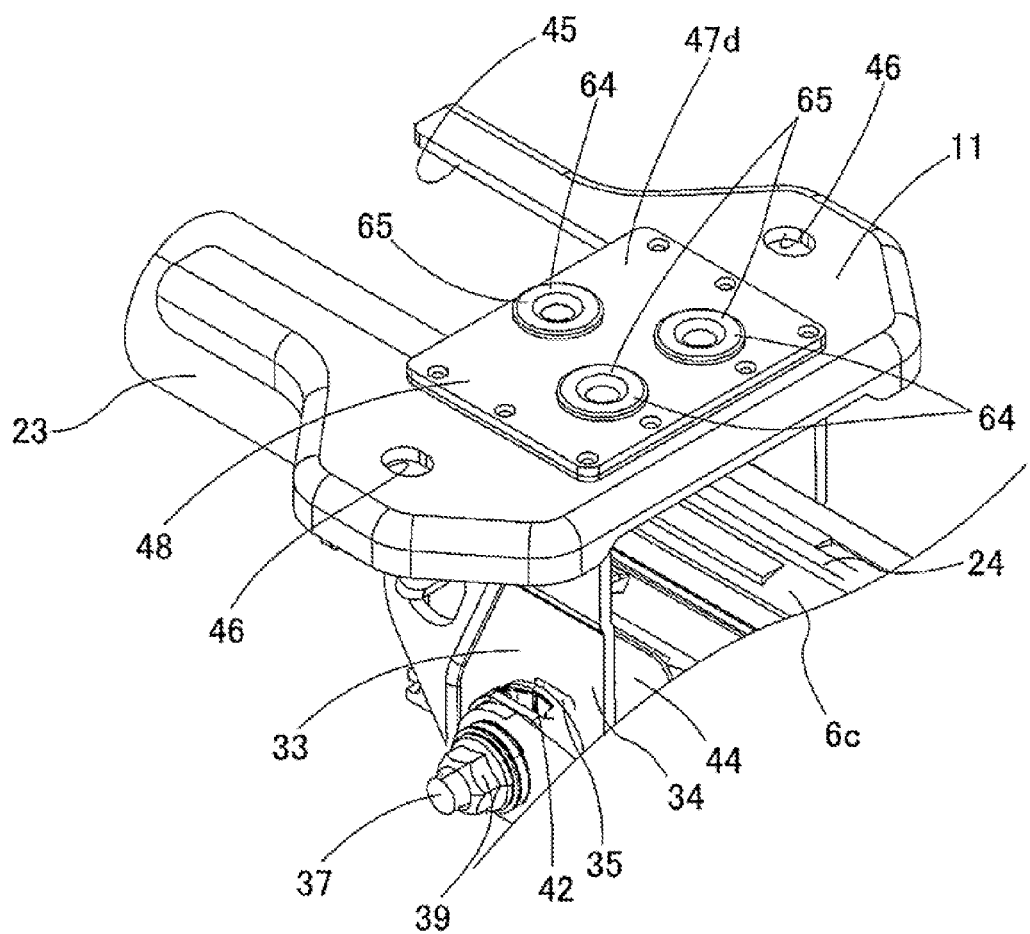
FIG. 10 is a perspective drawing illustrating a first example of a third embodiment of the present invention, and illustrates the major parts comparable to the center section in FIG. 4.
Figure 11:
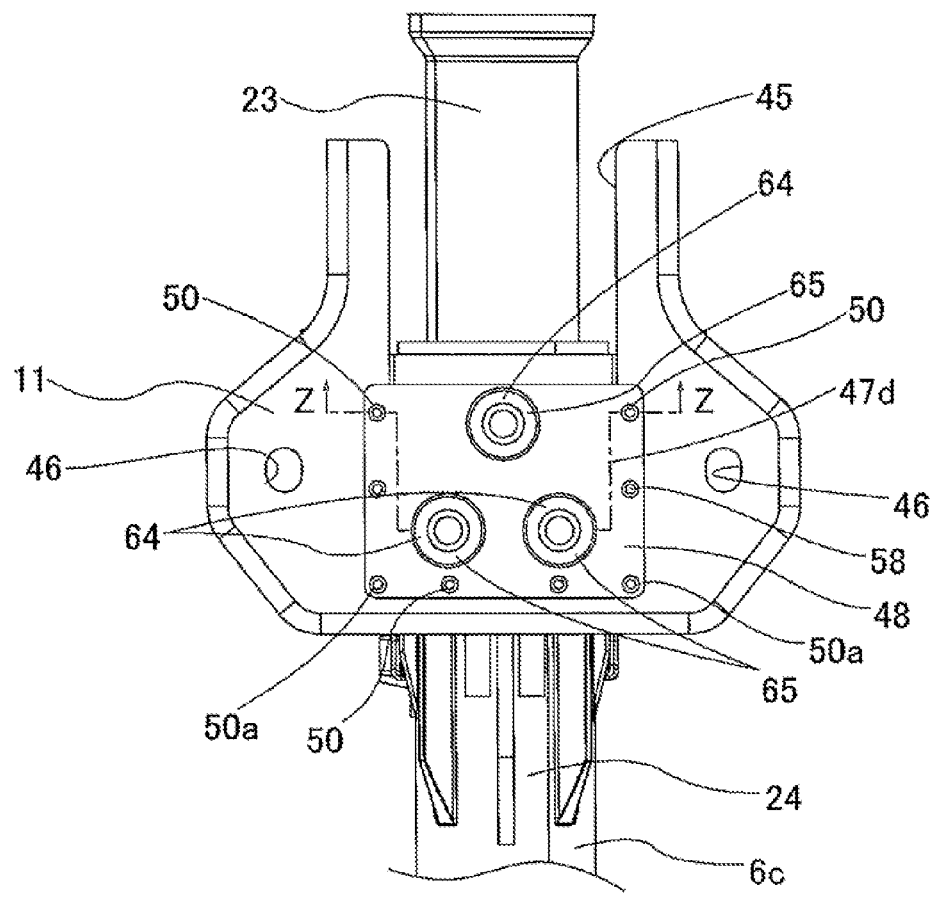
FIG. 11 is a top view illustrating the first example of the third embodiment of the present invention, and illustrates the state after rivets have been mounted.
Figure 12:
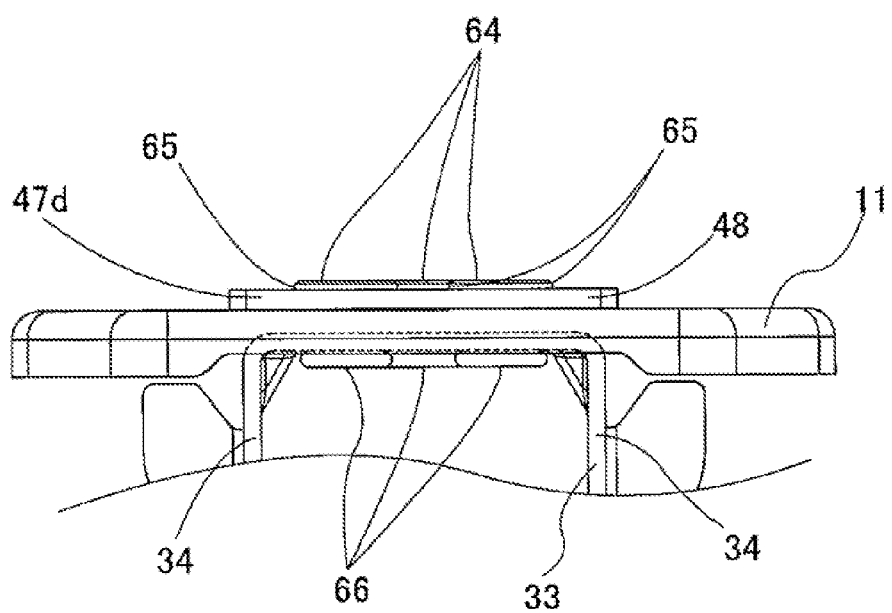
FIG. 12 is an end view illustrating the first example of the third embodiment of the present invention, and illustrates the major parts comparable to the top section in FIG. 5.
Figure 13:
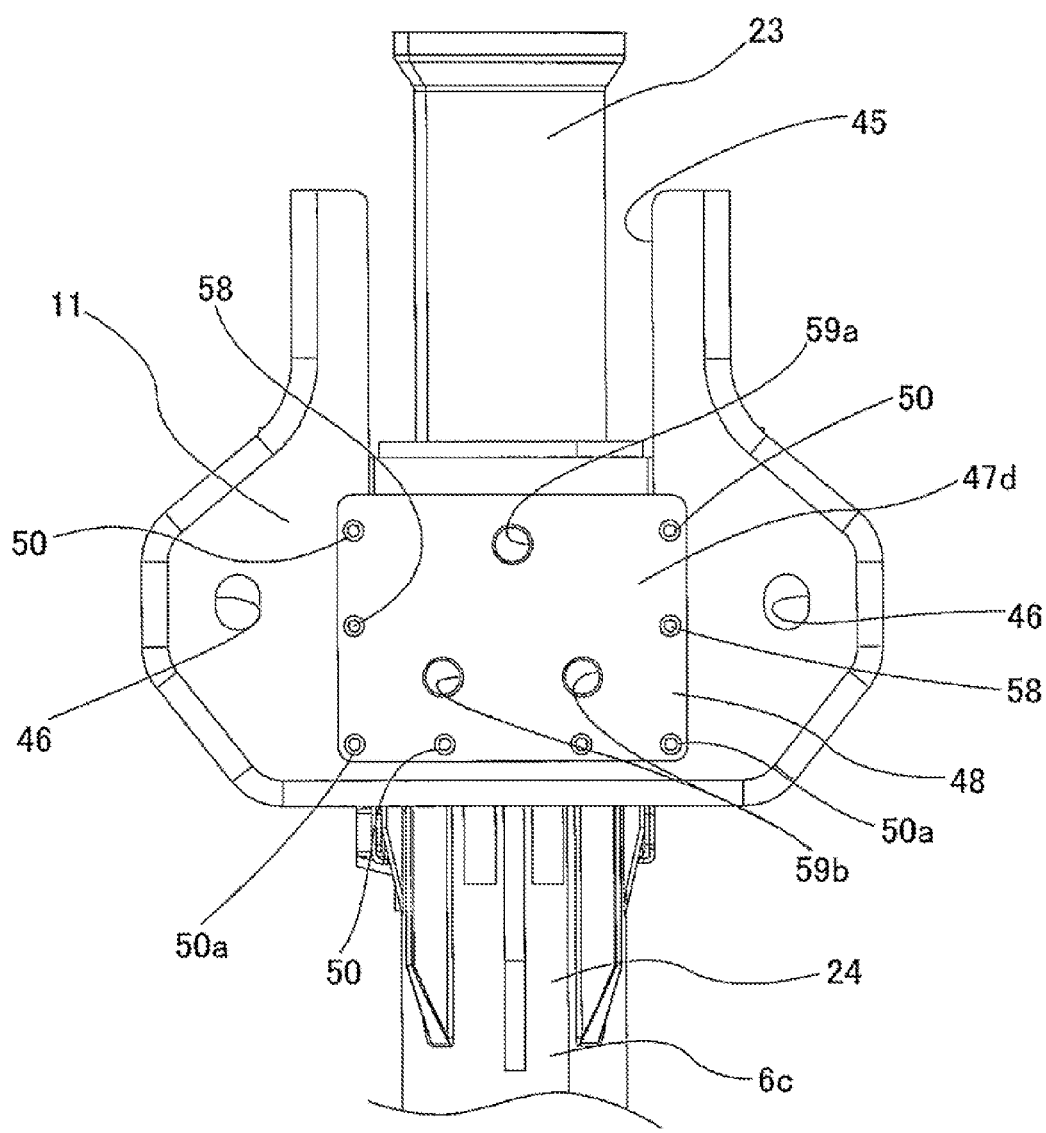
FIG. 13 is a top view illustrating the first example of the third embodiment of the present invention, and illustrates the state before the rivets are mounted.
Figure 14:
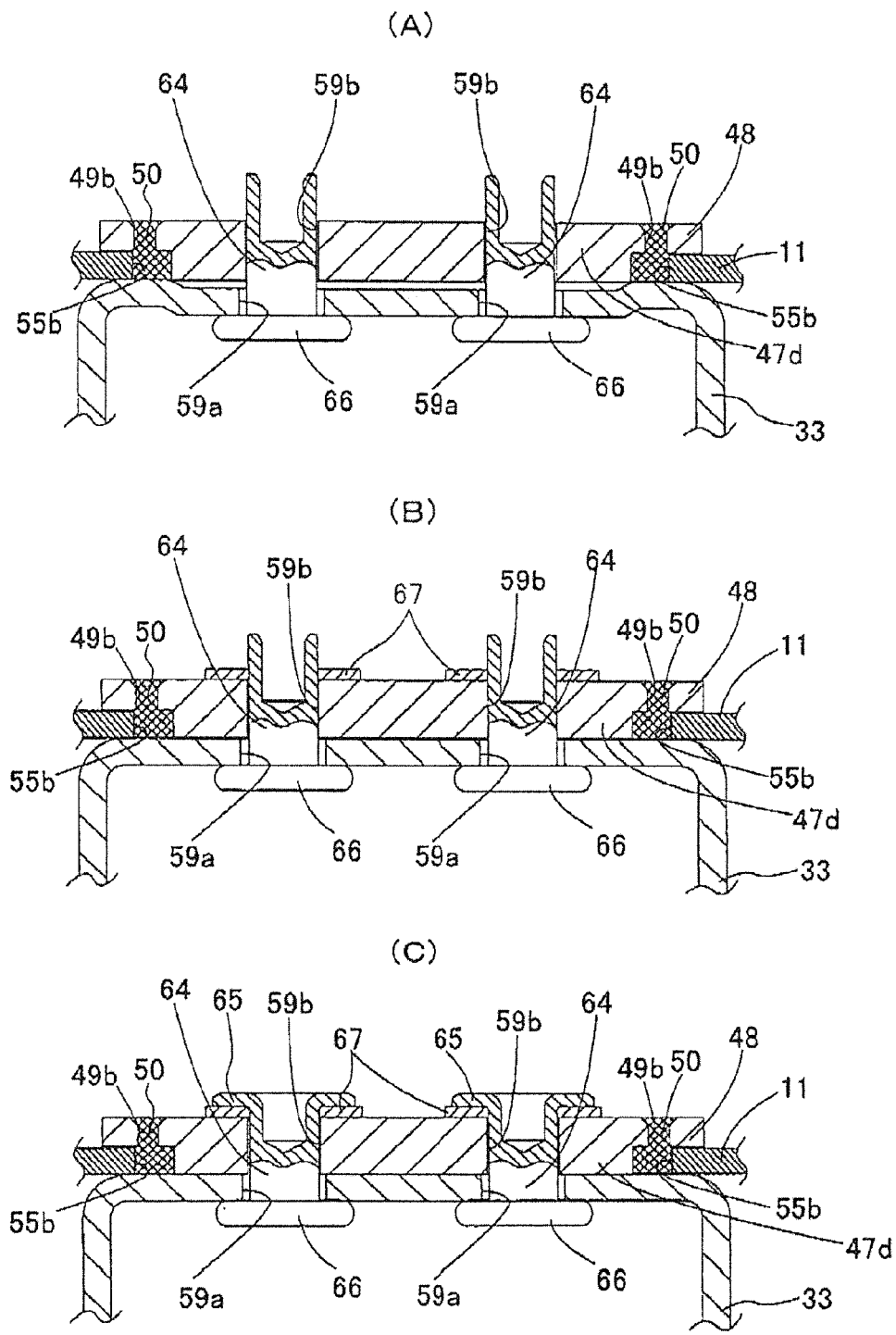
FIG. 14A to FIG. 14C are drawings illustrating the first example of the third embodiment of the present invention, and are cross-sectional views of section X-X in FIG. 11 that illustrate the order of processing in forming a swaging section on the tip end section of each rivet in order to connect the bracket on the column side and the locking capsule.

FIG. 9 illustrates a second example of the second embodiment of the present invention. The first example of the second embodiment was illustrated for the case wherein the present invention was applied to the construction illustrated in FIG. 7A, however, this second example is for the case wherein the present invention is applied to the construction illustrated in FIG. 7B. In conjunction with this, in the case of this variation, the thickness of the locking capsule 47c is thicker than in the case of the first example of the second embodiment. Moreover, the length dimension of the threaded sections 63a of the bolts 51a is also increased. Therefore, in the case of the construction of this example, the length dimension of the screwed sections of the threaded sections 63a and the screw holes 60 can be increased, so it is also possible to use a light alloy other than an iron alloy or a high functional resin as the material for the locking capsule 47c.

The advantage of using the same shape for the locking capsule 47c as illustrated in FIG. 7B is the same as in the case of the second example of the first embodiment, the construction and function of the other parts are the same as in the first embodiment and the first example of the second embodiment described above, so an explanation of identical parts is omitted.

[First Example of Third Embodiment]

FIG. 10 to FIG. 14 illustrate a first example of a third embodiment of the present invention. The feature of the construction and function of this example is that in order to simplify the construction of the connecting section of the locking capsule 47d and the bracket 33 on the column side, the locking capsule 47d and the bracket 33 on the column side are connected and fastened by three rivets 64, thus eliminating the nuts 52 (see FIG. 7A). The construction and function of the other parts are the same as in the construction of the first embodiment, so an explanation of identical parts is omitted or simplified, such that the explanation below centers on the features of this example.

The bracket 33 on the column side and the locking capsule 47d, as in the first embodiment, are connected and fastened by rivets 64 in three locations. The positions of these three rivets 64 are the same as the positions of the three bolts 51 and three nuts in the first embodiment, with two positions being near the rear of the locking capsule 47d and nearer to both ends than the center section in the width direction, and one location being near the front in the center section in the width direction. In order to place rivets 64 in these three locations, through holes 49a, 54a are respectively formed in part of the bracket 33 on the column side and in the locking capsule 47d in portions that are aligned with each other. The rivets 64 are inserted from the bottom through these through holes 49a, 54a, and swaged sections 65 are formed by plastically deforming the tip end sections (top end sections) of the rivets 64; and by holding the locking capsule 47d and the bracket 33 on the column side between the head sections 66 formed on the base end section (bottom end section) of the rivets 64 and the swaged sections 65, the locking capsule 47d and the bracket 33 on the column side are connected and fastened together.

With the locking capsule 47d and the bracket 33 on the column side held between the swaged sections 65 and the head sections 66 of the rivets 64, the locking capsule 47d and the bracket 33 on the column side push one another between the swaged sections 65 and the head sections 66. In other words, in the construction of this example, by devising the shape of the bracket 33 on the column side, the swaged sections 65 are formed on the top end sections of the rivets 64 while elastically deforming the center section in the width direction of the bracket 33 on the column side toward the locking capsule 47d. In other words, as illustrated in FIG. 14A, the bracket 33 on the column side 33 and the locking capsule 47d are connected and fastened together, so before forming the swaged sections 65 on the tip end sections of the rivets 64, the center section in the width direction of the bracket 33 on the column side is depressed in comparison with both end sections.

When connecting and fastening the bracket 33 on the column side and the locking capsule 47d, first, as illustrated in FIG. 14A, the rivets 64 are inserted from the bottom into the through holes 59a, 59b. Next, the head sections 66 of the rivets 64 are pressed toward the bracket 33 on the column side, causing the center section in the width direction of the bracket 33 on the column side to elastically deform. Then, as illustrated in FIG. 5B, the top surface of the center section in the width direction of the bracket 33 on the column side comes in contact with the bottom surface of the locking capsule 47d, or separated by a small space. When doing this, the portion of the locking capsule 47d near the perimeter of the top surface is held, and even though a force is applied from the rivets 64, the locking capsule 47d does not displace upward. Washers 67 are fitted around the portions on the tip end of the rivets 64 that protrude from the top surface of the locking capsule 47d.

Next, as the rivets 64 are pushed upward, and with the top surface of the locking capsule 47d supported, the swaged sections 65 are formed on the tip end sections of the rivets 64 as illustrated in FIG. 5C. In other words, of the cylindrical section that is formed on the tip end sections of the rivets 64, the portions that protrude further upward than the top surfaces of the washers 67 are plastically deformed outward in the radial direction, to form outward facing flange shaped swaged sections 65. Then, after these swaged sections 65 have been processed, the force pushing the rivets 64 upward and the force supporting the top surface of the locking capsule 47d are released. In this state, the washers 67, the locking capsule 47d and the bracket 33 on the column side are held between the swaged sections 65 and the head sections 66. Moreover, an elastic force due to the elastic deformation of the bracket 33 on the column side is applied to these members 67, 47d, 33, so the members are firmly held between the swaged sections 65 and the head sections 66. As a result, the bracket 33 on the column side and the locking capsule 47d are firmly connected and fastened together by the rivets 64 such that there is no vibration between them. When forming the swaged sections 65 on the tip end sections of these rivets 64, the diameters of the portions near the tip ends of the rivets 64 are expanded, and the outer surfaces of the portions near the tip ends can also come in contact all the way around with inner surface of part of the through holes 59b. By doing so, the space between these through holes 59b and the rivets 64 is eliminated, and the locking capsule 47d and the rivets 64 can be prevented from shifting in the planar direction of the locking capsule 47d.

With the construction of this example, constructed as described above, as in the case of the first embodiment, tuning for stabilizing forward displacement of the steering wheel during a secondary collision can be simplified, as well as the steering column support apparatus can be made more compact, lightweight and low cost, and the design freedom can be maintained. Furthermore, the support rigidity of the locking capsule with respect to the bracket on the column side can be increased.

In other words, the bracket 33 on the column side and the locking capsule 47d are connected and fastened by three rivets 64. Therefore, it is not necessary to provide nuts for the bolts to screw into on the top of the locking capsule 47d. The height dimension of the washers 67 and the swaged sections 65 when protruding from the top surface of the locking capsule 47d is small, so it is possible to suppress an increase in assembly height due to the existence of nuts, and thus make the apparatus more compact. Moreover, due to the lowering of the cost because there is no need for nuts, and by making the apparatus more compact, it is possible to maintain the freedom of design of the steering apparatus installation portion. Furthermore, of the three rivets 64, the two rivets 64 near the rear are separated in the width direction, so the rigidity of the connecting section between the locking capsule 47d and the bracket 33 on the column side against moments can be increased.

[Second Example of Third Embodiment]

Figure 15:
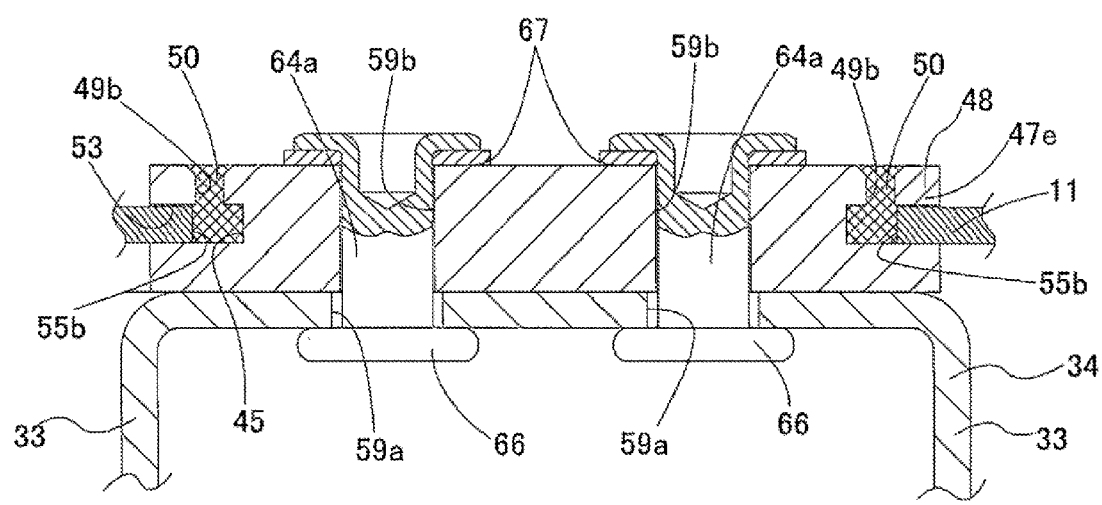
FIG. 15 is a drawing illustrating a second example of the third embodiment of the present invention, and is a cross-sectional drawing that is similar to that of FIG. 14C.

FIG. 15 illustrates a second example of the third embodiment of the present invention. In the first example of the third embodiment, the present invention was applied to the construction illustrated in FIG. 7A, however, in this example, the present invention is applied to the construction illustrated in FIG. 7B. In conjunction with this, in the case of this example, the thickness of the locking capsule 47e is thicker than in the first example of the third embodiment. Moreover, the length dimension of the rivets 64 is also longer.

The advantage by making the shape of the locking capsule 47e the same as in FIG. 7B is the same as in the second example of the first embodiment, and the construction and function of the other parts are the same as in the first example of the third embodiment described above, so an explanation of identical parts is omitted.

[Third Example of Third Embodiment]

Figure 16:
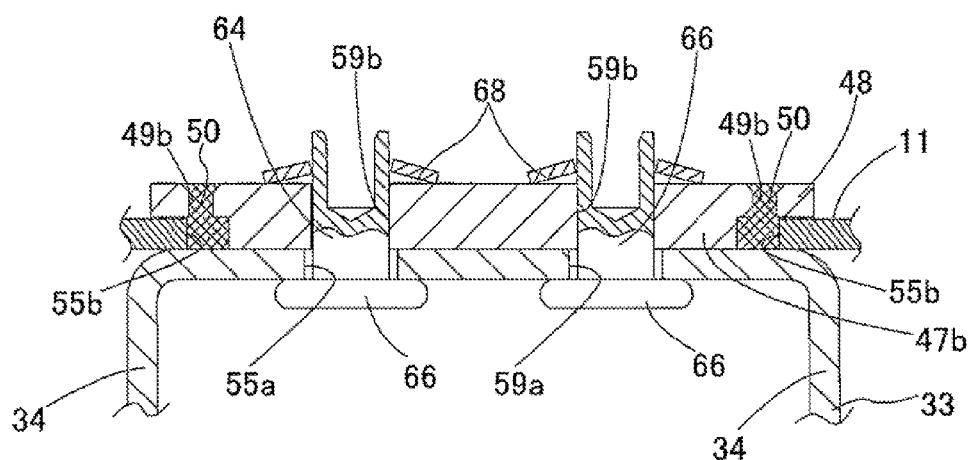
FIG. 16A and FIG. 16B are cross-sectional views illustrating the third example of the third embodiment of the present invention, and are similar to the drawings of FIGS. 14A to 14C.
Figure 16:
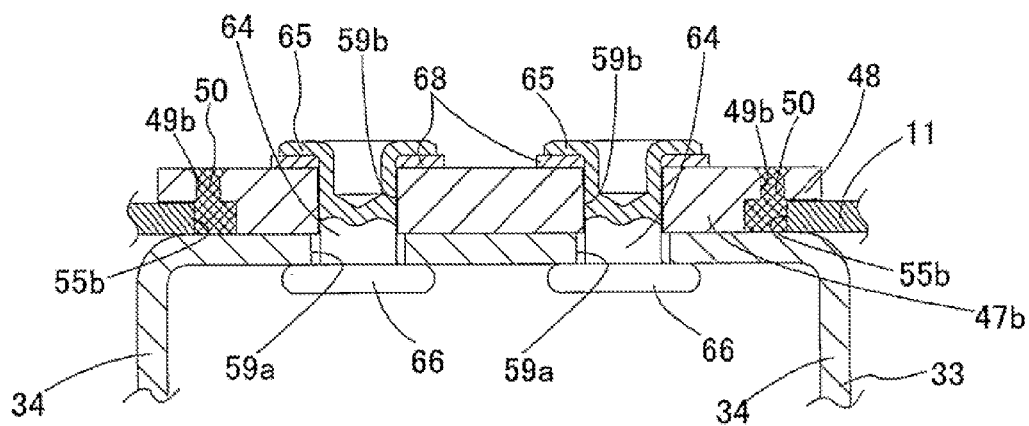

FIGS. 16A and 16B illustrate a third example of the third embodiment of the present invention. In this example, spring washers 68, such as disk or leaf springs, are provided between the swaged sections formed on the tip end section of the rivets 64 and the top surface of the locking capsule 47d. In other words, the swaged sections 65 on the tip end sections of the rivets 64 are formed such that they are elastically deformed and pressed in a direction that shortens the thickness dimension in the axial direction of the spring washers 68. The locking capsule 47d, the bracket 33 on the column side and the spring washers 68 are held between the swaged sections 65 and the head sections 66 that are formed on the base end sections of the rivets 64, connecting and fastening the locking capsule 47d and bracket 33 on the column side together.

When assembling the construction of this example, as illustrated in FIG. 16A, the top surfaces of the head sections of the rivets 64 are brought into contact with the bottom surface of the bracket 33 on the column side, and from the state of spring washers 68 being fitted around the outside of the tip end sections of these rivets 64, these spring washers 68 are elastically deformed, and as illustrated in FIG. 16B, swaged sections 65 are formed on the tip end sections of these rivets 64. In the state after these swaged sections 65 have been formed, due to the elastic force of the spring washers 68, the bracket 33 on the column side and the locking capsule 47d are connected and fastened together so that there is no vibration.

As illustrated in the example in the figures, holding the spring washers 68 between the bottom surfaces of the swaged sections 65 and the top surface of the locking capsule 47d, 47e is suitable, however, spring washers 68 may also be provided between the top surfaces of the head sections 66 and the bottom surface of the bracket 33 on the column side. Furthermore, it is possible to provide two spring washers 68 for each rivet 64, one on the top side of the locking capsule 47d and one on the bottom side of the bracket 33 on the column side.

In any of the embodiments, as long as the requirement for strength and rigidity of the connecting section between the locking capsule and the bracket on the column side is not too high, there are cases wherein one set of through holes that are formed in the locking capsule and bracket on the column side at aligned positions, and a bolt or rivet that is inserted through these through holes to connect the locking capsule and column bracket will be enough.

INDUSTRIAL APPLICABILITY

The present invention can also be applied to a steering column support apparatus that comprises only a tilt mechanism or only a telescopic mechanism, and can be applied to a fixed steering wheel type steering column support apparatus that does not comprise either of these mechanisms.

EXPLANATION OF THE REFERENCE NUMBERS

1 Steering wheel
2 Steering gear unit
3 Input shaft
4 Tie rod
5, 5a, 5b Steering shaft
6, 6a, 6b, 6c Steering column
7 Universal joint
8 Intermediate shaft
9 Universal joint
10, 10a Housing
11, 11a, 11b Bracket on the vehicle side
12, 12a Bracket on the column side
13 Bracket on the housing side
14a, 14b Installation plate section
15a, 15b Cutout section
16a, 16b Sliding plate
17 Energy absorbing member
18 Locking notch
19 Locking capsule
20 Locking groove
21a, 21b Small locking hole
22 Locking pin
23 Inner column
24 Outer column
25 Outer shaft
26 Ball bearing
27 Electric motor
28 Controller
29 Support cylinder
30 Center hole
31 Slit
32 Supported plate section
33 Bracket on the column side
34 Support plate section
35 Long hole in the up/down direction
36 Long hole in the forward/backward direction
37 Adjustment rod
38 Head section
39 Nut
40 Driving cam
41 Driven cam
42 Cam apparatus
43 Adjustment lever
44 Friction plate unit
45, 45a, 45b Locking hole (locking notch)
46 Installation hole
47, 47a, 47b, 47c, 47d, 47e Locking capsule
48 Flange section
49, 49a, 49b Small through hole on the capsule side
50, 50a, 50b Locking pin
51, 51a, 51b Bolt
52 Nut
53 Locking groove
54 Small through hole on the bracket side of the bracket on the vehicle side
55a, 55b Small notch section on the bracket side
56 Synthetic resin
57 Small space
58 Pin shaped member
59, 59a, 59b Through hole
60, 60a Screw hole
61 Head section
62 Spacer
63, 63a Threaded section
64, 64a Rivet
65 Swaged section
66 Head section
67 Washer
68 Spring washer

What is claimed is:

1. An assembly method for a steering column support apparatus, the steering column support apparatus comprising:

a bracket on the vehicle side that has a locking hole that is provided in the center section in the width direction and that extends in the axial direction of the steering column, and that is supported by and fastened to the vehicle body and does not displace in the forward direction during a secondary collision;
a bracket on the column side that is supported by the steering column and that displaces in the forward direction together with the steering column during a secondary collision; and
a locking capsule that is locked in the locking hole in the both ends thereof with fastened to the bracket on the column side, and of which both sides on the top end are located on the top side of the bracket on the vehicle side in the portions on both sides of the locking hole,
with part of the locking capsule located inside the locking hole, this locking capsule and the bracket on the vehicle side being connected together by a connecting member that shears due to an impact load that is applied during the secondary collision, and the bracket on the column side being supported by the bracket on the vehicle side so that the bracket on the column side can break away in the forward direction due to an impact load that is applied during a secondary collision;
this assembly method comprising steps of:
fitting the locking capsule into the locking hole;
with the positional relationship between the locking capsule and bracket on the vehicle side in a state shifted from the final assembled state, aligning together part of a plurality of through holes on the capsule side that are formed in part of the locking capsule such that they pass in the vertical direction through the portions that overlap in the vertical direction the portion of the bracket on the vehicle side that surrounds the locking hole, and part of a plurality of receiving sections on the bracket side that are formed in the portion of the bracket on the vehicle side that surrounds the locking hole;
inserting pin shaped members such that the pin shaped members span between part of these through holes on the capsule side and part of the receiving sections on the bracket side;
positioning the locking capsule and bracket on the vehicle side in the final assembled state, causing the pin shaped members to shear;
aligning the remaining through holes on the capsule side with the remaining receiving sections on the bracket side; and
inserting connecting members such that the connecting members span between these remaining through holes on the capsule side and the remaining receiving sections on the bracket side.

2. The assembly method for a steering column support apparatus according to claim 1 wherein the pin shaped members and connecting members are formed by injection molding of injecting synthetic resin such that the synthetic resin spans between part of the through holes on the capsule side and part of the receiving sections on the bracket side, and/or spans between the remaining through holes on the capsule side and the remaining receiving sections on the bracket side.

3. The assembly method for a steering column support apparatus according to claim 2, wherein
at least part of the receiving sections on the bracket side are small notch sections that are formed such that these notch sections open toward the inside of the locking hole; and
part of the synthetic resin that is filled inside each of the small notch sections, when the locking capsule and bracket on the vehicle side are positioned in the final assembled state, penetrates between the inside surfaces of the locking hole and the inner surfaces of the locking capsule that face these inside surfaces and covers at least part of the space that exists between these surfaces.

4. The assembly method for a steering column support apparatus according to claim 1, wherein
the length in the forward/backward direction of the locking hole is greater than the length in the same direction of the locking capsule, with the length of the locking capsule being just long enough that even when the locking capsule has displaced in the forward direction together with the steering column due to a secondary collision, at least part of the locking capsule is positioned on the top side of the front end section of the bracket on the vehicle side, preventing the locking capsule from dropping down;
the final assembled state is a state wherein the locking capsule is pushed completely to the back end section of the locking hole; and
the state shifted from the final assembled state is a state wherein the locking capsule is shifted further toward the opening side or front end side of the locking hole than the back end section of the locking hole.

5. A steering column support apparatus that is obtained from the assembly method for a steering column support apparatus according to claim 1, comprising:
a bracket on the vehicle side that has a locking hole that is provided in the center section in the width direction and that extends in the axial direction of the steering column, and receiving sections on the bracket side that are formed in the portion of the bracket on the vehicle side that surrounds the locking hole, this bracket on the vehicle side being supported by and fastened to the vehicle body so as not to displace in the forward direction during a secondary collision;
a bracket on the column side that is supported by the steering column and that displaces in the forward direction together with the steering column during a secondary collision; and
a locking capsule that is locked in the locking hole in the both ends thereof with fastened to the bracket on the column side, and of which both sides on the top end are located on the top side of the bracket on the vehicle side in the portions on both sides of the locking hole, the locking capsule having through holes on the capsule side that are formed in the part of the locking capsule such that they pass in the vertical direction through the portions that overlap in the vertical direction the portion of the bracket on the vehicle side that surrounds the locking hole,
in the assembled state, and in the normal state during operation, part of the through holes on the capsule side and part of the receiving sections on the bracket side being not aligned, and the sheared surfaces of the sheared pins that exist in at least one of these elastically coming in contact with the top surface of the bracket on the vehicle side or an inner surface of the top end of the locking capsule, and
with part of the locking capsule positioned inside the locking hole, the bracket on the column side being supported by the bracket on the vehicle side by way of the connecting members that spans between the remaining through holes on the capsule side and the remaining receiving sections on the bracket side such that the bracket on the column side can break away in the forward direction due to an impact load that is applied during a secondary collision.

6. The steering columns support apparatus according to claim 5, wherein at least part of the receiving sections on the bracket side are small notch sections that are formed to open toward the inside of the locking hole such that part of the synthetic resin that is fed inside the small notch sections penetrates in between the inside surfaces of the locking hole and the surfaces of the locking capsule that face these inside surfaces and covers at least part of the space that exists between these surfaces.

* * * * *